US005623540A

United States Patent [19]
Morrison et al.

[11] Patent Number: 5,623,540
[45] Date of Patent: Apr. 22, 1997

[54] PBX DATA RETRIEVAL AND REPORTING SYSTEM AND METHOD

[75] Inventors: David Morrison, San Jose; Gale Marinelli, Los Gatos; Barbara Chin, Santa Clara, all of Calif.

[73] Assignee: Siemens Rolm Communications, Inc., Santa Clara, Calif.

[21] Appl. No.: 318,317

[22] Filed: Oct. 5, 1994

[51] Int. Cl.$^6$ .......................... H04M 15/00; H04M 3/00; H04M 5/00

[52] U.S. Cl. .......................... 379/115; 379/112; 379/115; 379/265; 379/266

[58] Field of Search .................................. 379/112, 113, 379/114, 121, 265, 266, 115, 34, 119, 118, 117, 116; 364/401

[56] References Cited

U.S. PATENT DOCUMENTS

| | | | |
|---|---|---|---|
| 4,456,788 | 6/1984 | Kline et al. . | |
| 4,788,712 | 11/1988 | McNass et al. | 379/113 |
| 4,988,209 | 1/1991 | Davidson et al. | 379/112 |
| 5,165,983 | 11/1992 | Brown et al. | 379/112 X |
| 5,247,611 | 9/1993 | Norden-Paul et al. . | |
| 5,289,368 | 2/1994 | Jordan et al. | 379/113 X |
| 5,333,183 | 7/1994 | Herbert . | |

FOREIGN PATENT DOCUMENTS

| | | |
|---|---|---|
| 0376526A2 | 12/1989 | European Pat. Off. . |
| 0481784A2 | 10/1991 | European Pat. Off. . |
| 0483664A2 | 10/1991 | European Pat. Off. . |
| 0535270A1 | 10/1991 | European Pat. Off. . |

OTHER PUBLICATIONS

*The Fourteenth Annual International Computer Software & Applications Conference*, George J. Knafl, Oct. 31–Nov. 21, 1990, pp. 255–260.
*Usage of Two TimeZone Parameters Per Location*, IBM Technical Disclosure Bulletin, 34(7A):145–148, Dec., 1991.
U.S. Healthcare/ROLM Emerald Project—Executive Checkpoint Agenda (Oct. 12, 1992).
Memo from James Mackey (ROLM/Siemens) to Distribution dated Jul. 9, 1992.
Memo from James Mackey (ROLM/Siemens) to Rich Castor dated Jun. 19, 1992.
Memo from Rich Castor (U.S. Healthcare, Inc.) to Jim Mackey (ROLM/Siemens) dated Jun. 1, 1992.
Emerald Functionality as of Mar. 16, 1992, (Mar. 16, 1992).
Emerald Application Software A20 Version 1.3, (Mar. 2, 1992).
U.S. Healthcare Call Center Consolidated Reporting System Task Force, (Late 1991).
Consolidated Reporting System Application Spoftware A20 Version 1.0, (Nov. 27, 1991).
USHC Requirements/Solutions Summary (Summer 1991).
ROLM Callstat Historical Reports, Standard Reports Release 4.5 (product sold 1990).
ROLM Callstat Historical Reports, vol. 1: Systems Summary Release 4.7 (product sold 1990).
ROLM Callstat Historical Reports, vol. 2: Systems Summary Options Release 4.7 (product sold 1990).
ROLM Callstat Historical Reports, vol. 3: Agent Performance Release 4.7 (product sold 1990).

*Primary Examiner*—Wellington Chin
*Assistant Examiner*—Paul Loomis

[57] ABSTRACT

A system and method is provided for scheduling data collection sessions between a collection computer and one or more computerized branch exchanges (CBXs). Telephone statistics data collected from the CBXs is stored into a database in the collection computer and accumulated according to fixed time intervals and one or more previously created organizational hierarchies. A report generation system and method is also provided for selectively retrieving stored data and formatting it into a report with features including time zone adjustment, time offsets, data element calculations, and "where" conditions, all in a manner which does not require the user to understand the underlying database organization or any programming languages.

46 Claims, 18 Drawing Sheets

FIG. 10

EMPLOYEES

LAST NAME: EHRILOH
FIRST NAME: CARRIE
MIDDLE INITIAL:
EMPLOYEE ALIAS: CARRIE
EMPLOYEE ID: 8
LOCATION CODE:
CURRENT SUPERVISER: RAMA

VIEW  EDIT  1 OF 1

SSN #:
DATE OF BIRTH:
PHONE NUMBER:
ADDRESS:

EFFECTIVE DATE: CURRENTLY EFFECTIVE SETTINGS

◆ AGENT   ◇ NON-AGENT

ACD IDENTIFICATION — 1003

| SWITCH NAME | ACD GROUP | LOGON/POS.ID | SWITCH AGENT NAME |
|---|---|---|---|
| TREK | LA6Serve | 60603 | CARRIE1 |
| TREK | SFPSrv1 | 70701 | CARRIE2 |

— 1002

ADD  DELETE

EMPLOYEE STATUS:

SERVICE START DATE: 03/21/94
SERVICE END DATE:

◆ ACTIVE
◇ INACTIVE

◆ PERMANENT   ◇ TEMPORARY
◆ FULL-TIME   ◇ PART-TIME
◆ EXEMPT      ◇ NON-EXEMPT

COMMENT:

NEXT  PREVIOUS  DELETE  REPORT

PRINT WINDOW    APPLY    RESET    QUIT    HELP 1001
1004

FIG. 13

REPORT WRITER

◇ ON-DEMAND  ◇ SCHEDULE  ◇ DESIGN

CATEGORIES
TRENDING
ART REPORTS
XXXXXXXXXXXXXX
AGENT REPORTS
DNIS
SOURCE
TRUNK GROUP REPORTS

REPORTS
ABANDONED CALL PROFILE-TOTALS
ANSWERED CALL PROFILE - %
ANSWERED CALL PROFILE - TOTALS
COMPARISON OF ANSWER TIME
COMPARISON OF OTHER TIMES
COMPARISON OF TALK TIME
DETAIL
XXXXXXXXXXXXXXXXXXXXXXXXX

DATE RANGE: 05/13/94   TO: 05/13/94
TIME RANGE: 8:00 AM    TO: 8:30 AM
TIME RANGE:            TO:
TIME:                  TO:

—1306

05/13/94 - 05/13/94
8:00 AM - 9:30 AM (PDT)

TRUTH —1301
INCOMING CALL SERVICE SUMMARY

| ACD GROUP NAME AND TIME OF DAY | AVG. ANSWER TIME | % SVL | TARGET [+/-] | % ABAN | % OVFL OUT | % OVFL IN | REQ'D | ACTUAL | [+/-] | INBOUND AGENTS [+/-] | % [+/-] |
|---|---|---|---|---|---|---|---|---|---|---|---|
| **GOLD CARD MACBETH 1994-05-13 FRI | | | | | | | | | | | |
| 8:00 AM - 8:15 AM | 0:03 | 100 | 10 | 12 | 24 | 33 | 35 | 51 | 16 | | 45 |
| 8:15 AM - 8:30 AM | 0:04 | 100 | 10 | 12 | 29 | 38 | 34 | 49 | 15 | | 45 |
| 8:30 AM - 8:45 AM | 0:04 | 100 | 10 | 14 | 28 | 33 | 34 | 50 | 16 | | 48 |
| 8:45 AM - 9:00 AM | 0:03 | 100 | 10 | 13 | 24 | 33 | 34 | 51 | 17 | | 50 |
| 9:00 AM - 9:15 AM | 0:04 | 100 | 10 | 13 | 28 | 34 | 34 | 50 | 16 | | 46 |
| 9:15 AM - 9:30 AM | 0:03 | 100 | 10 | 12 | 25 | 33 | 34 | 50 | 16 | | 49 |
| REPORT TOTALS | 0:04 | 100 | 10 | 13 | 26 | 34 | 34 | 50 | 16 | | 48 |

1302 %SVL   1303 AVG ANSWER TIME
1304, 1305 row brackets

PRINT WINDOW   APPLY   PRINT | DISPLAY | FILE   RESET   OVERRIDE SETUP   QUIT   HELP

FIG. 15

REPORT WRITER
◇ ON-DEMAND  ◇ SCHEDULE  ⬦ DESIGN

SETUP INFO FOR COLUMN DATA ITEM #1

DATA TYPE
ACD AGENT
ACD GROUP
ACD MONITORED DNIS
ACD ROUTE STEP
ACD ROUTING TABLE
ACD SOURCE NUMBER
TRUNK GROUP
_1501_

DATE ELEMENT NAME
AVA
AVGANSOVFLTIME
AVGANSPRIMTIME
AVGCONSULTIME
AVGHANDLETIME
AVGOUTGEXTERNTIME
AVGSTAFF
AVGWORKMODETIME
AVGWORKSTATETIME
_1502_

DATA ELEMENT DESCRIPTION
AVERAGE TIME ANSWERED GROUP CALLS WAITED BEFORE ANSWERED
_1503_

DISPLAY FORMAT _1504_
FORMAT: MM:SS    UNITS: SECONDS
COLUMN WIDTH: 8
DECIMAL PLACES: 0

COLUMN JUSTIFICATION
◇ LEFT
◇ CENTER
◆ RIGHT

TIME OFFSET
◇ NONE
◇ INTERVAL
◇ DAY
◇ WEEK
◆ MONTH

_1505_
OFFSET VALUE: 0
ORGANIZATION OFFSET: 0

[OK] [APPLY] [RESET] [CANCEL] [HELP]

FIG. 17

EDIT SETUP INFORMATION FOR SECTION 1

◇ ORGANIZATION  ◆ DATA DETAILS  ◇ DATA CRITERIA  ◇ SCHEDULE CRITERIA

|  | TOTAL | AVERAGE | HIGHEST | DATA ELEMENT | LOWEST | DATA ELEMENT |
|---|---|---|---|---|---|---|
| QUARTER HOUR | ☒ | ☐ | ◁▷ ☐ | | ◁▷ ☐ | |
| HALF HOUR | ☐ | ☐ | ◁▷ ☐ | | ◁▷ ☐ | |
| HOUR | ☐ | ☐ | ◁▷ ☐ | | ◁▷ ☐ | |
| SESSION | ☐ | ☐ | ◁▷ ☐ | | ◁▷ ☐ | |
| DAY | ☐ | ☐ | ◁▷ ☐ | | ◁▷ ☐ | |
| WEEK | ☐ | ☐ | ◁▷ ☐ | | ◁▷ ☐ | |
| MONTH | ☐ | ☐ | ◁▷ ☐ | | ◁▷ ☐ | |
| YEAR | ☐ | ☐ | ◁▷ ☐ | | ◁▷ ☐ | |

☒ TOTAL BY DATE/TIME RANGE

[ OK ]   [ CANCEL ]   [ HELP ]

FIG. 18

PBX DATA RETRIEVAL AND REPORTING SYSTEM AND METHOD

This application is related in subject matter to copending U.S. application Ser. No. 08/318,454 entitled METHOD AND APPARATUS FOR INTERFACING COMPUTERS TO EXCHANGE TELEPHONE CALL BUSINESS INFORMATION naming the same inventors and having a common assignee.

BACKGROUND OF THE INVENTION

1. Field of the Invention

This invention relates generally to telephone private branch exchanges (PBXs) and, more particularly, to a system and method for retrieving telephone call statistics from PBXs and generating useful reports therefrom.

2. Related Information

Private Branch Exchanges (PBXs) are switching devices used by organizations with a need for internal telephone communication and for routing telephone calls from external telephone lines to internal telephones. A PBX may be connected to a switching office of the public telephone network, and multiple PBXs may be tied together to handle a large number of telephone lines.

As technology has improved, PBXs have become more sophisticated, employing computer circuits and data storage facilities to automatically route telephone calls to available agents, and to monitor call information such as the duration of each call. Such PBXs are sometimes called CBXs (Computerized Branch Exchanges) to distinguish them from less capable devices. As an example, these CBXs can be used in an airline reservation system employing dozens or even hundreds of airline reservation agents, whereby a CBX routes incoming calls made to a toll-free number to an available agent. Agents can "log on" to the CBX by entering their log-on ID from the telephone at which they will service incoming calls.

An example of a known CBX is the ROLM 9751 family of CBXs, including the models 30 and 80. These CBXs can automatically store information regarding where each call was routed (i.e., which phone line), the duration of each call, the length of time required before the call was answered, and the like. This information, which is stored and accumulated in the CBX over a predetermined time period (such as every 15 minutes), can be retrieved and monitored by supervisors using preformatted data reports. Based on the preformatted data reports, the supervisors can make personnel changes due to changes in the incoming telephone call load.

FIG. 1 depicts in simplified form a conventional CBX configuration which may comprise a ROLM 9751 family device, for example. The CBX 101 includes means for accepting a plurality of input lines L1 to L4 and for servicing a plurality of telephones P1 to P6 connected thereto, grouped into two groups G1 and G2 for purposes of automatic call distribution. Although FIG. 1 shows only a few telephone lines for the purposes of illustration, it will be appreciated that dozens of such telephone lines may be handled by a single CBX. CBX 101 comprises a first CPU 102 for controlling switching hardware 103 to accept telephone calls from the incoming lines and route each call to an appropriate telephone line based on well known criteria such as selecting the first available line in a group.

First CPU 102 is coupled to and communicates with second CPU 104 for the purpose of transferring call information, such as the starting and ending time of each call. CPU 104 collects such call information on a call-by-call basis, accumulates certain of the information (such as total talk time for all calls in a time period) and stores it on disk 105 for later retrieval. CBX 101 is also coupled to a plurality of PCs 107 and 108 through serial ports 106. At least one PC may be coupled to a printer 109 for printing various reports displayed on the PC. Additionally, printers may be directly connected to a serial port such as element 106.

Both CPU 102 and CPU 104 may comprise any suitable microprocessor and any suitable operating system. In various embodiments, an Intel family microprocessor such as the 80486 may be used, and SCO UNIX may be used for the operating system.

During operation, human supervisors operate each PC 107 and 108 to monitor the call information collected by CPU 104, such as total number of calls per unit of time, total number of calls per group of telephones, and the like. The supervisors enter commands from each PC which are transmitted through serial ports 106 to CPU 104, and a computer program on second CPU 104 (not shown) retrieves call information from its memory and/or disk 105 and transmits preformatted data to the requesting PC for display. Data may be stored on disk 105 for several days and is typically deleted automatically on a "rolling" time basis.

In large installations, calls are often directed to a particular "pool" or group of agents connected to the same CBX, and if that particular group becomes overburdened with incoming telephone calls, a supervisor may detect this condition (by reviewing the report data) and may accordingly assign more agents to the group in order to help balance the load.

While automated reports such as those discussed above are adequate in many cases, there has been an unsatisfied need for more sophisticated and reliable information. For example, clients with large installations (including multiple CBXs distributed across various sites) may be interested in information such as:

- the number of calls received by a particular agent over a long period of time (days, weeks, or a year)
- the average time spent talking by a particular agent over a long period of time
- the average time spent talking per arbitrarily defined group of agents (i.e., groups distinct from those predefined by the CBX)
- for groups of agents which are organized into higher level management structures, the average waiting time for agents in that management group
- statistics accumulated across a plurality of CBXs (such as a department which requires multiple CBXs, or geographically separate groups)
- trend analysis of data, such as the number of received calls increasing or decreasing over time (including comparison of busy parts of a week)
- comparison of activity of an individual agent with the performance of the group or department of which he is a member
- tracking the quality of service being provided to customer callers.

Because of the manner in which CBXs are connected into various systems, it has heretofore been difficult or impossible to assimilate information across a plurality of CBXs, each of which maintains its own database, or to accumulate information on a basis other than that already accumulated by the CBX. For example, information relating to a particular department or corporate division may end up being distributed across two different CBXs. As another example, management structures or hierarchical groupings of agents (such as a Sales group and a Service group) cannot be formed within a CBX, and even if this were possible, such groupings could not span across multiple CBXs. Accordingly, there is an unsatisfied need to automatically accumulate and analyze CBX information from a plurality of CBXs, some of which may be at different geographical locations.

It would be desirable to track telephone calling information based on an artificially created hierarchy, instead of relying on the rigid hardware-driven grouping of phone lines and trunk lines. For example, it would be desirable to assign a select group of agents to a department or organization, and to further assign these departments or organizations to a larger division or other corporate structure. Telephone calling information could then be automatically tracked based on departments, divisions, or other hierarchical groupings. As an example, it would be desirable to combine telephone calling statistics from all the Sales groups into the Sales division. This has heretofore been impossible because of the manner in which CBXs are connected and because of the manner in which data is retained and disseminated from the CBX. If such information were to be copied and stored across multiple CBXs, severe configuration problems could result, and permanent communication links among the CBXs would be required to ensure that all the information was up-to-date. Consequently, it is perceived as an advantage to maintain a physical segregation between the switching information stored in each CBX and organizational information stored in a separate location on a different computer.

Another desirable feature is the ability to reorganize hierarchies of information as described above without losing the underlying telephone call information.

A means of rapidly rearranging the collection and presentation of telephone call information is needed. It would be desirable, for example, to quickly set up a data collection process which could automatically track calling patterns attributable to a particular agent or department over a lengthy time interval without also collecting information for all other such agents or departments. Moreover, it is desirable to have certain data pre-accumulated into fixed intervals (such as monthly or yearly statistics) instead of re-generating such information from a huge database of "raw" data when a report is needed. This would improve report performance and reduce data storage requirements.

Additionally, it would be desirable to provide mathematical operations based on the collected data in essentially real time; for example, a moving window of average calls per hour for a particular group or department. It would also be desirable to automatically single out agents who are making or accepting personal calls, or who consistently underperform.

Long-term statistical analysis of telephone call data is also a desirable feature, particularly for forecasting purposes. For example, it is desirable to compile reports regarding long-term trends in the number of calls per hour per agent or department. Providing such information has been extremely difficult because of the aforementioned problems.

Finally, various conventional report generation methods generally require the report creator to understand details of an underlying database representation in order to create a useful report therefrom, forcing users to undergo extensive database training. Moreover, there is a general lack of flexibility in reporting tools, forcing users to adjust to particular report formats instead of allowing the user to define report formats using a user-friendly interface. For example, most database reporting tools require an understanding of a programming language to create customized reports. This hinders custom report creation because it requires particular skills and debugging time.

SUMMARY OF THE INVENTION

In order to satisfy the aforementioned needs, the present invention contemplates a system and method for automatically retrieving telephone call statistics from one or more CBXs in the form of database records, accumulating a plurality of the database records over predefined time intervals and user-created organizational hierarchies, and printing out reports from user-created templates.

Embodiments of the present invention contemplate various features, including user-friendly creation of organizational hierarchies and automatic data accumulation based on these hierarchies, automatic schema compatibility determination between a collection computer and one or more CBXs, creation of report templates from a set of user-friendly screens, segregation of report templates based on user security concerns, automatic time zone adjustment for data which is collected from different time zones, and time and organizational offsets for juxtaposition of similar data from different time periods. A full appreciation of the scope of the invention will be gleaned from the following description and figures.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 10 illustrates one example of a computer screen which may be used to enter employee information in accordance with embodiments of the present invention.

FIG. 13 shows one example of a report generated in accordance with various principles of the invention.

FIG. 15 shows an example of a screen layout for allowing a user to specify data types and elements for one column of a report in accordance with embodiments of the present invention.

FIG. 17 shows an example of a screen layout for specifying data details in a report, including a time interval for each row of the report in accordance with embodiments of the present invention.

FIG. 18 shows an example of a screen layout for specifying data criteria in a report in accordance with embodiments of the present invention.

DETAILED DESCRIPTION

Overview of Operation

Figure 1:
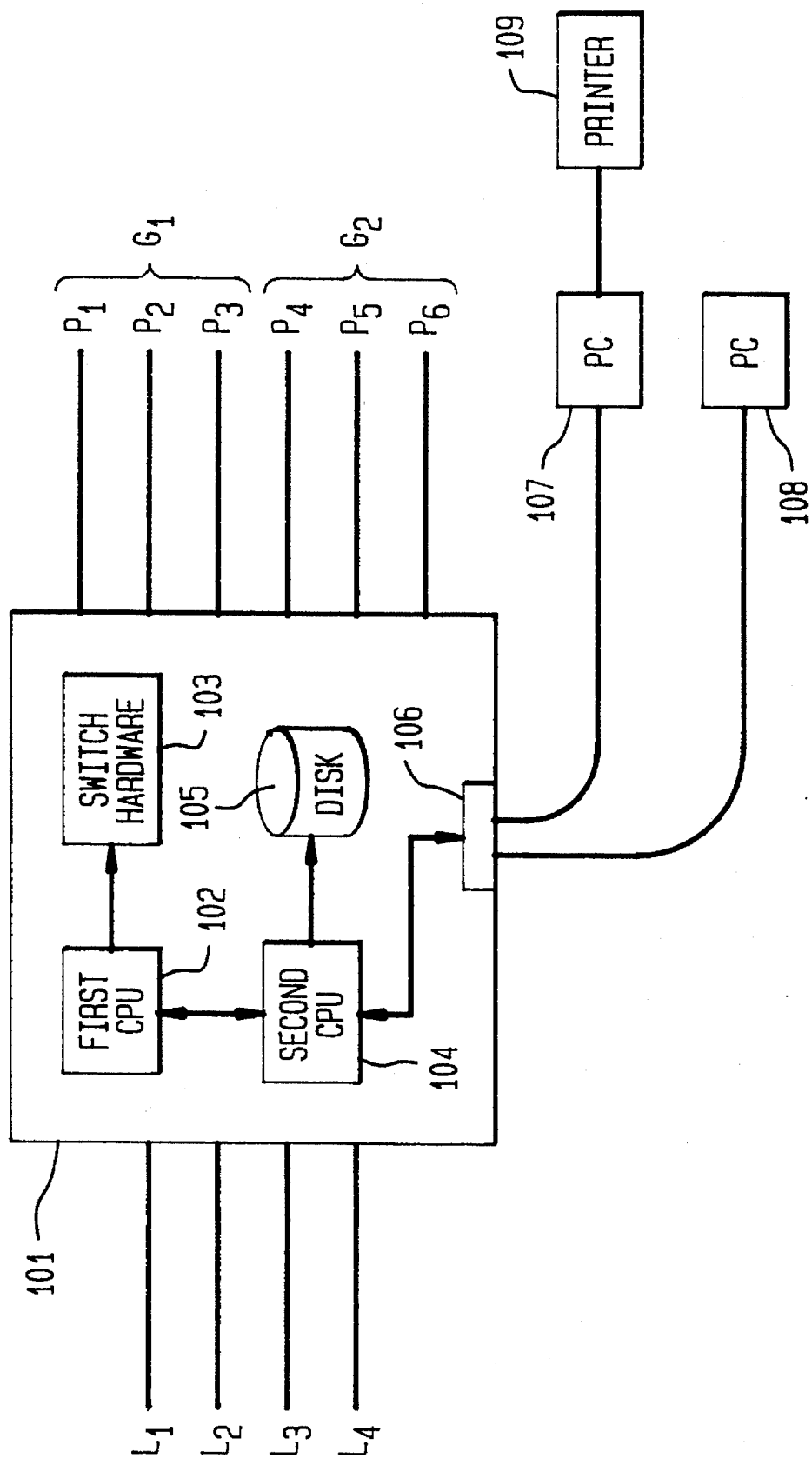
FIG. 1 shows a simplified view of a typical CBX configuration which is known in the art.
Figure 2:
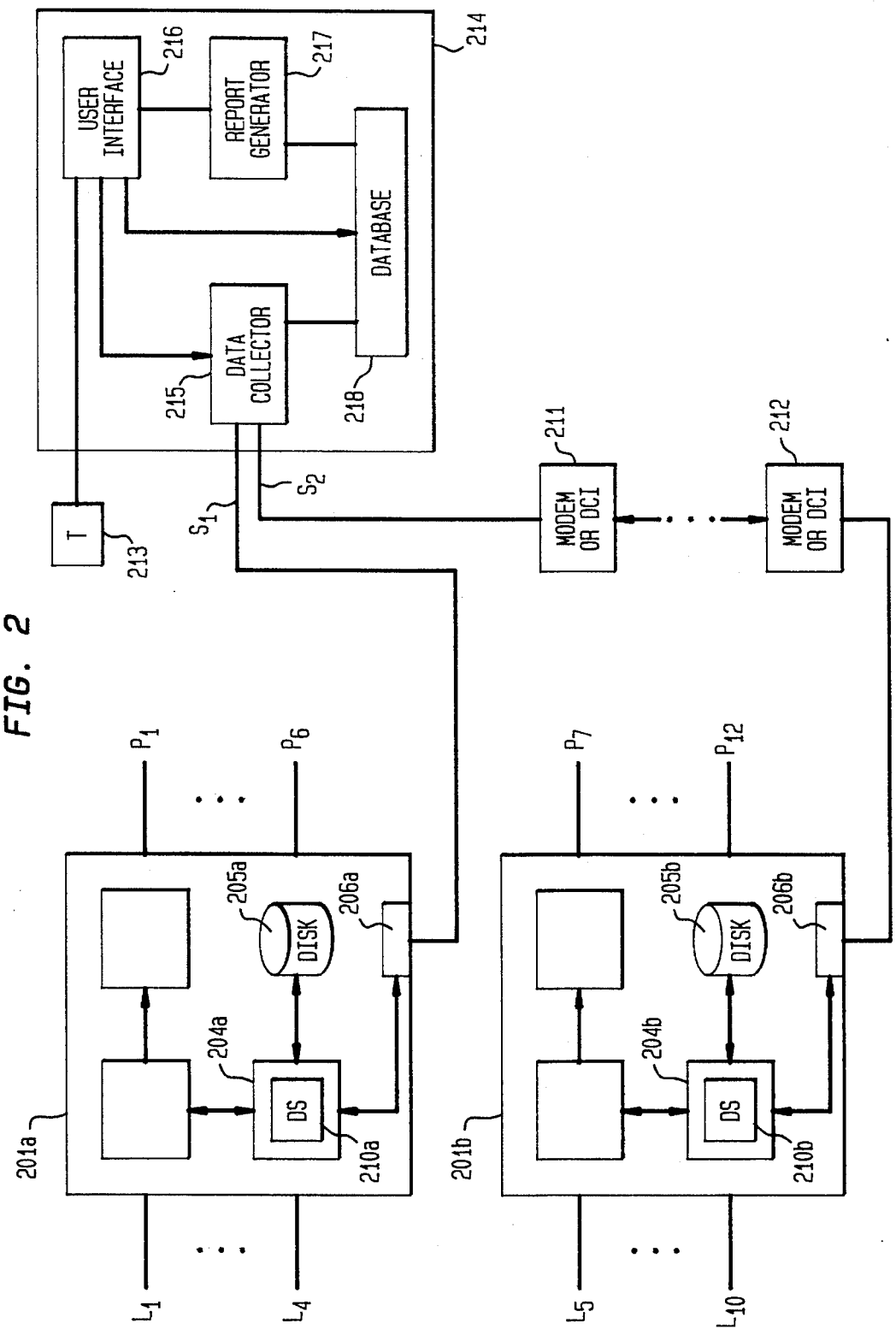
FIG. 2 shows in block diagram form components employing various principles of the present invention.

FIG. 2 illustrates an example configuration employing various principles of the present invention. A first CBX 201a and a second CBX 201b are similar to CBX 101 shown in FIG. 1. A difference, however, is the addition of software modules 210a and 210b, which act as data servers for servicing commands generated from collection computer 214 as explained in more detail below. Each CBX is coupled to collection computer 214 (which may, for example, comprise an IBM RS/6000 RISC processor) through serial lines S1 and S2 respectively. First CBX 201a is connected directly to collection computer 214 through serial port 206a, while second CBX 201b is connected by way of modems 211 and 212 and ultimately through serial port 206b, wherein second CBX 201b may be located at a different physical site from first CBX 201a. In various embodiments, a data transfer rate of 19.2 Kbaud may be used for direct connections between a CBX and collection computer 214, while for modem connections, a rate of 9600 baud may be employed. While only two CBXs (i.e., 201a and 201b) are shown in FIG. 2, it will be appreciated that more than two CBXs may be connected to collection computer 214 either directly or through modems. Additionally, CBXs may be connected to collection computer 214 through virtually any communication schemes including line drivers, local data lines, data communication interfaces (DCIs), local area networks, wide area networks, or the like.

PCs such as PCs 107 and 108 illustrated in FIG. 1 may also be connected to first CBX 201a and second 201b of FIG. 2.

Collection computer 214 comprises, in various embodiments, data collector 215, user interface 216, report generator 217, and database 218. A user terminal T is coupled to user interface 216 in order to allow a user to control the apparatus. Data servers 210a and 210b (shown within CBXs 201a and 201b) interact with data collector 215 in a manner described below.

Data collector 215 gathers statistics and configuration information from one or more CBXs on a periodic basis according to a user-defined schedule. Once the user has set up a collection schedule, no further user intervention is required. In summary, data collector 215 "logs in" to each CBX and collects statistics for a particular time period. Each data server 210 extracts information requested by data collector 215 from its database (stored on disk 205) and transmits it to data collector 215 using a communications package such as the well-known Zmodem protocol. In various embodiments, each CPU 204a and 204b is configured to include a UNIX username and password which allows data collector 215 to "log-in" to the operating system.

In order to carry out data collection from each CBX, data collector 215 may issue various commands to each CBX and receive responses therefrom. In various embodiments, commands may be provided for the following operations:

schema command: requests information regarding the database schema for the particular CBX.

system information command: requests information regarding the CBX system configuration.

open database command: requests that the CBX open a particular database for access.

destination file command: notifies the CBX of the file name into which received data should be stored.

olddate command: requests the date/time of the oldest entry in any table in the statistics database stored in the CBX.

select command: requests data from a particular database table which satisfies a specified selection criteria.

log-on/log-off command: used by data collector 215 to log onto or off of the CBX data server.

The operation of the above commands will be described in the context of the operation of data collection between data collector 215 and each data server 210. It will be appreciated that the principles of the present invention may be carried out using commands or message exchanges other than those specifically described above.

Except for the transmission of database data via Zmodem (which incorporates its own error checking procedures), the command-response exchange between data collector 215 and each CBX need not utilize a checksum or other error detection mechanism over the link, but may instead detect errors by using the full duplex echo from each data server 210 to check each character as it is sent. When data collector 215 detects that a character has been corrupted, it sends a control-U character to the particular data server to cancel the line, and then resends the command. Data collector 215 sends no more than one outstanding command at a time for any single CBX.

Calling statistics stored on each disk 205a and 205b may be stored in a relational database such as INFORMIX™, and database 218 on collection computer 214 may also comprise a relational database, preferably of the same type as the one on each CBX for compatibility reasons. In operation, each CBX independently collects and stores telephone calling information for telephone lines serviced by that CBX. In accordance with a user-defined schedule, data collector 215 collects intervals of stored data from each CBX data server 210 and incorporates the collected data into database 218 on collection computer 214 for use in generating reports based on additional information stored in database 218. Data servers 210a and 210b receive incoming database commands from computer 216 and pass them to their own databases which may be stored on disks 205a and 205b, respectively. When database results are returned from the statistics databases located on disks 205a and 205b, data servers 210a and 210b pass the results via a communication package such as Zmodem back to collection computer 216.

DATABASE CONFIGURATION

Figure 3:
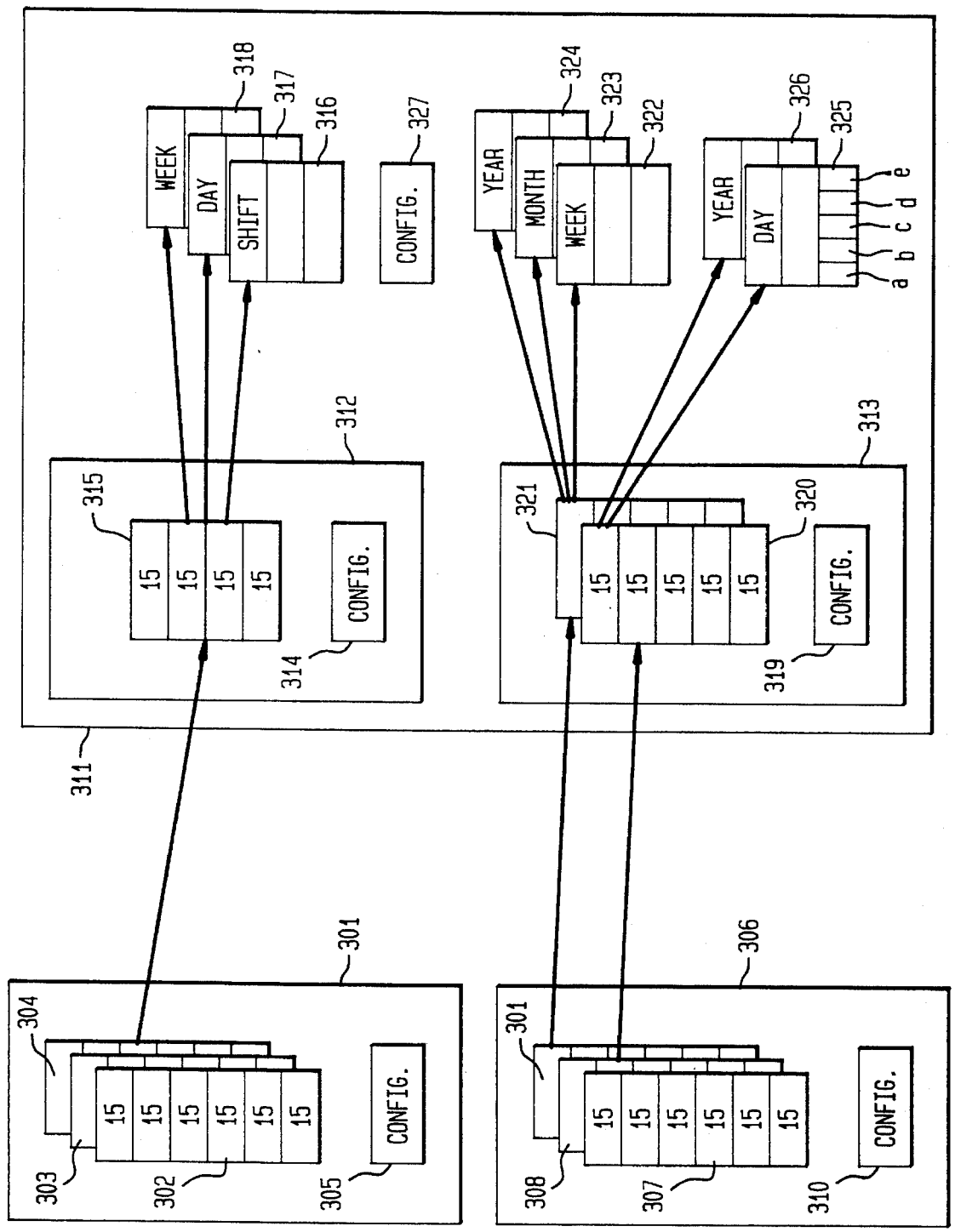
FIG. 3 shows an example of how databases may be organized between two CBXs and a main computer in accordance with embodiments of the present invention.

The various databases stored on each CBX 201a and 201b and on collection computer 214 will now be described with reference to FIG. 3. In FIG. 3, database 301 stores telephone data accumulated within CBX 201a of FIG. 2, while database 306 stores telephone data accumulated within CBX 201b of FIG. 2. Each database 301 and 306 may be respectively stored on disks 205a and 205b of CBXs 201a and 201b. In various embodiments, each CBX database includes a configuration database and a statistics database which may comprise multiple tables. For example, database 301 includes configuration database 305 and statistics tables 302, 303, and 304. Each statistics table comprises a plurality of records, each record containing telephone calling information collected over a predetermined time period (for example, 15 minutes as illustrated in FIG. 3). The tables may be configured in various ways as needed, and it may of course be possible to store all information in a single table in certain applications.

Similarly, database 306 (on CBX 201b) comprises its own configuration database 310 and statistics tables 307, 308, and 309. Each of these statistics tables comprise a plurality of records containing telephone calling information collected over a predetermined time period, such as 15 minutes. All of the tables on any one CBX may be stored in the same relational database, such as INFORMIX™.

Generally speaking, each configuration database may include information regarding group names, agent names and identifiers, assignments of agents to groups, queuing methods used for each group, and the like. This information generally relates switching hardware within the CBX to other entities such as agents, trunk groups, service levels per group of agents, and the like.

Each statistics table comprises information regarding telephone calling statistics for the CBX on which the table resides. With reference to database 301, statistics table 302 may include records which accumulate information for each group of telephone lines. Thus, each record in table 302 may contain information such as:

total number of telephone calls per 15-minute interval for a particular group or groups of phone lines total number of telephone calls which were abandoned for a particular group or groups of phone lines.

A second statistics table 303 may include records which accumulate information for each agent connected to the CBX, such as:

total amount of time spent on calls per agent per 15-minute interval total time spent on off-network calls per 15-minute interval.

Yet a third statistics table 304 may include records which accumulate information for each trunk group, such as:

total number of incoming calls per trunk line per 15-minute interval total unanswered calls per trunk line per 15-minute interval.

Similar tables are maintained in database 306, but relating to second CBX 201b.

The statistics tables in databases 301 and 306 are updated at regular intervals by CPUs 204a and 204b, respectively, such that data is accumulated in each CBX. After a predetermined period of time (such as 14 or 42 days), the oldest data may be automatically deleted on a "rolling" basis in order to retain storage space in the CBX.

In accordance with the data collection principles of the present invention, selected information from databases 301 and 302 may be retrieved and transmitted to database 311, which resides on collection computer 214 shown in FIG. 2 (database 311 of FIG. 3 is thus a subset of database 218 of FIG. 2). As illustrated in FIG. 3, a portion of statistics table 304 from database 301 (i.e., from CBX 201a) has been retrieved into table 315 in database 312 (part of database 311) after a series of scheduled data collection transactions. That is, as data accumulates in database 301, portions of the accumulated data may be automatically and selectively copied into a statistics table in database 312 having the same fields, but the number of records may be different, corresponding to a different length of time for accumulated data.

The data which is selectively retrieved into database 311 may not be optimally structured for reporting in a desirable manner. Accordingly, database 311 contains additional statistics tables 316, 317 and 318 comprising records which accumulate longer time periods than those included in the records of table 315. For example, table 316 accumulates information on the basis of a "shift" (such as an 8-hour shift) using the information contained in table 315. That is, after each data collection session, the information in a plurality of records from table 315 is accumulated and stored as a record in table 316. Similarly, the data accumulated over an entire day may be stored in a record in table 317, and data accumulated over an entire week may be stored in a record in table 318. In this manner, data is instantly available over a variety of time periods in database 311 and for generally longer periods of time than may be stored in each CBX.

Similarly, data from two statistics tables from database 306 have been selectively and automatically copied into database 313 (part of database 311) as illustrated in the bottom portion of FIG. 3. Data from table 309 has been copied into table 321, and data from table 308 has been copied into table 320. Moreover, data from table 321 has been accumulated into tables 322, 323 and 324 (weekly, monthly and yearly), while data from table 320 has been accumulated into tables 325 and 325 (daily and yearly accumulations). Thus, for each statistics table in database 313, one or more additional database tables may exist in database 311 which accumulate the various fields and records over a different time interval. As shown in table 325, each record may comprise a plurality of fields (a through e) each of which holds information on a particular statistic (e.g., total number of calls per group, average time spent waiting per agent, etc.). Although FIG. 3 shows different accumulation patterns between data from CBX 201a (database 312) and CBX 201b (database 313), in various embodiments it may be more suitable to use identical accumulation patterns for each CBX (i.e., keep shift, day, week, month, year accumulation tables for each CBX) in order to promote uniformity and ease of reporting. Thus, it should be understood that the difference in table configurations between databases 312 and 313 is shown only as an example.

Configuration databases 305 and 310 are also copied into database 311 (as databases 314 and 319, respectively), but these databases generally only need to be copied infrequently (such as once per day or less) because the configuration information changes less frequently. Moreover, a separate configuration database 327 is stored in database 311 for reasons which will become apparent. Among other things, this separate configuration database includes information which identifies the organizational hierarchy used to accumulate information in a hierarchical manner. Although the configuration databases are shown as being stored separately, it is of course within the scope of the present invention to store all such configuration information into the same physical database with appropriate record identifiers to segregate the information as needed. The same principle applies to the statistics tables.

SCHEMAS AND SCHEMA COMPATIBILITY

Each CBX may have a potentially different database schema according to which data is stored. (Generally speaking, a schema is the definition of fields and data types which are stored in each record, and the organization of records into tables in the database.)

The present invention contemplates the collection of data from different CBXs having potentially different database schemas, as will now be described in more detail. Once a set of fields has been defined for a particular database table in a CBX, any new fields added to the database table should be added to the end of the record. This allows data collector 215 to ignore these extra fields if they are not supported on the data collector database.

Figure 4:
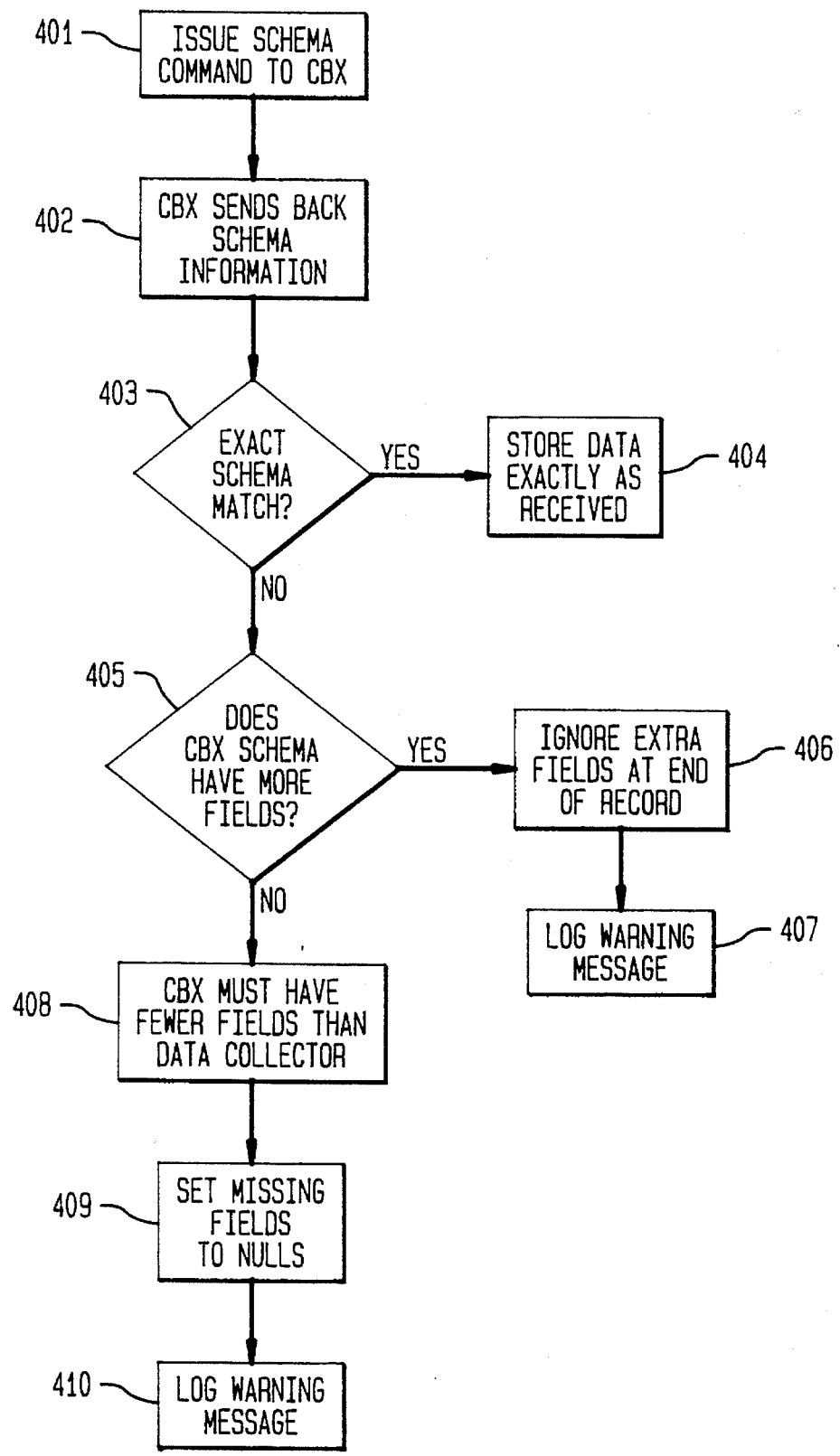
FIG. 4 is a flow chart showing an example of how database schema information may be collected from different CBXs in accordance with embodiments of the present invention.

FIG. 4 provides a flow chart for the operation of data collector 215 with respect to identifying schema compatibility between databases 301 and 306 retained on each CBX (e.g., 201a and 201b) and database 311 stored in collection computer 214. When data collector 215 "logs on" to each CBX for the first time, it issues a schema command (step 401) to obtain information about the database tables stored in the CBX. The CBX to which the command is directed sends back schema information (step 402) as described below.

The schema command may specify a database name and a table name. The schema command opens the specified database to retrieve information about a database table. When the command is successfully executed, each CBX (by way of data servers 210a and 210b) will preferably return the following schema information:

1. database, table name
2. version, number of fields
3. fldname1, fldname2, . . . , fldnamen
4. fldtype1, fldtype2, . . . , fldtypen
5. fldlen1, fldlen2, . . . fldlenn The above fields are defined as follows:

database: the name of the database (e.g., configuration or statistics)

table name: the name of the table requested in the specified database version: the version number of the database schema. This version number is the same for all tables in a particular database. Whenever the database schema changes, the version number changes as well.

number of fields: the number of fields in the database table (i.e., the number of columns).

fldname: the names of the fields in the specified database table, listed in the order in which they are stored in the table.

fldtype: the data type of each field listed in the preceding line; preferably corresponds to a data type in the published database specification.

fldlen: the length in bytes of each field.

Referring again to FIG. 4, in step 403 data collector 215 makes a determination as to whether there is an exact schema match between database 311 and the database on the CBX to which the schema command was directed. A match may be initially determined on the basis of a comparison between version numbers in the CBX database and database 311, and further by a detailed comparison of the schema definitions received from the CBX with those stored in database 311 (i.e., table-by-table, field-by-field comparison). If the schemas match exactly, data collector 215 will henceforth store an exact copy of the data received from the particular CBX into database 311 (step 404).

If the schemas do not match exactly, data collector 215 makes a determination in step 405 as to whether the schema on the requested CBX database ("CBX schema") has more fields than those in database 311. If the particular CBX schema has more fields than those in database 311, data collector 215 will henceforth ignore the extra fields at the end of each record received from the CBX, but sets a flag indicating that the truncated record should be added to database 311 (step 406) and logs a warning message as to the ignored data (step 407).

If the schemas do not match exactly and the CBX schema does not have more fields than database 311, then in step 408 it is established that the CBX schema has fewer fields than are in database 311. In this situation, data collector 215 will henceforth set the "missing" fields from the CBX to nulls in database 311 (step 409) and log a warning message as to the nulled fields in database 311 (step 410).

Data collector 215 may also issue a request for system information from each CBX. In response to this request, the selected CBX returns the following information in various embodiments:

current date/time version number of the statistics database schema version number of the configuration database schema version number of the data server computer program The above described operation allows data collector 215 to operate with different database versions across different CBXs. This feature is particularly useful in the case where different CBXs are upgraded gradually rather than as a group, and allows incremental changes to databases across CBXs. The above operation can be easily extended to determining whether a particular order of fields in a database table has occurred on a particular CBX.

Data collector 215 may obtain statistics and configuration information in a single data collection session, or may obtain only one or the other in a single log-on session.

THE DATA COLLECTION PROCESS

The data collection process for statistics data will now be described with reference to FIG. 5, assuming that the process shown in FIG. 4 (or the like) has already been completed in order to determine the degree of schema compatibility between the database in each CBX and database 311. In step 501, the user specifies a list of CBXs from which data is to be collected, and a collection schedule for the same. A user screen such as that shown in FIG. 6 may be used, with user interaction provided by user interface 216 of FIG. 2. As can be seen in FIG. 6, the invention contemplates allowing the user to select separate collection schedules for each CBX and for each database in each CBX (i.e., statistics database and a configuration database). In various embodiments, the user interface may be implemented according to the X Window™/Motif™ graphical user interface standards. Although not shown in FIG. 6, the user may also specify a starting date and time before which data will not be collected; in other words, if a particular CBX has historical data from the past 42 days, the user can specify a starting date and time which will avoid collection of undesired "old" data. This user-specified time may be used as shown in step 507 of FIG. 5 to determine time parameters for a SELECT command.

At step 502, data collector 215 retrieves the first CBX from the list of CBXs specified by the user, and in step 503 determines whether, based on the current time, it is time to collect data for this CBX. If so, data collector 215 attempts to log onto the selected CBX (step 504), but otherwise the next CBX is retrieved from the list in step 502.

In step 505, data collector 215 opens the statistics database by issuing an "open database" command to the data server on the CBX. In step 506, it is determined whether this is the first time that statistics have been collected from this CBX. If this is the first time data collection has been done for this CBX, then all of its data may potentially need to be collected, and in step 507 it is determined whether the user specified a specific starting date/time for the data (that is, a time before which data already stored in the CBX will be ignored). If such a time was specified, then in step 508 the specified date/time is used to formulate a time interval for database retrieval. If no specific time was selected by the user, then in step 509 it is determined that data collection will proceed from the present time forward, and this fact is used in formulating a time interval for database retrieval. Finally, if in step 506 it is determined that this was not the first time that data was collected for this CBX, then in step 510 it is determined (by reference to internally stored flags) where the data collection process for this CBX last left off.

In step 511, a table is selected from which data will be collected using the time interval determined from either step 510, 509 or 508. In various embodiments, a list of tables from which data is to be collected may be stored in database 311. In step 512, a SELECT command is generated and issued for the target table over the specified time interval. In various embodiments, a maximum amount of time span (for example, 1 hour) may be fixed to limit the amount of data which will be retrieved by any particular SELECT statement. Time intervals which exceed this span will be broken up into smaller intervals limited to the maximum, and data collection will proceed for these smaller intervals until all the data has been collected for the larger interval.

In step 513, after data from the specified table is returned to collection computer 214, the returned data is stored into a file, and the file is loaded into database 311 in the appropriate statistics table, taking into account any schema differences (e.g., padding or nulling fields in the records). In step 514, it is determined whether there are more tables in the designated CBX from which to collect data. If so, processing resumes at step 511, and if not, in step 515 a log-off command is issued to the CBX and the process terminates.

For each table from which data is to be retrieved, data collector 215 sends a file name into which the table data will be received, sends a SELECT statement to the data server to request the data from the database table, and starts up Zmodem to receive the data from the CBX and store it in a destination file on collection computer 214.

Figure 5:
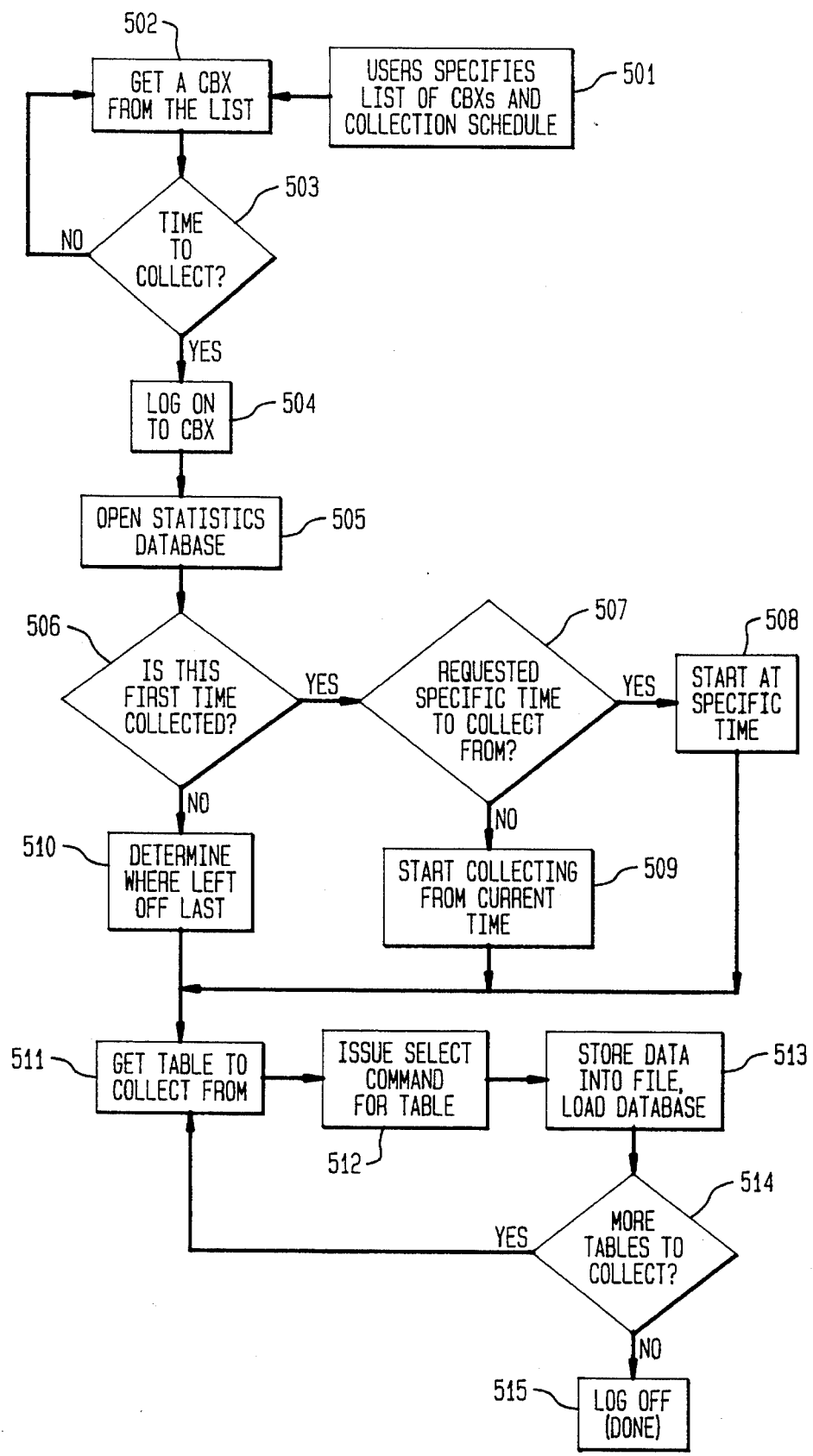
FIG. 5 is a flow chart showing an example of how telephone calling data may be collected from multiple CBXs in accordance with embodiments of the present invention.
Figure 6:
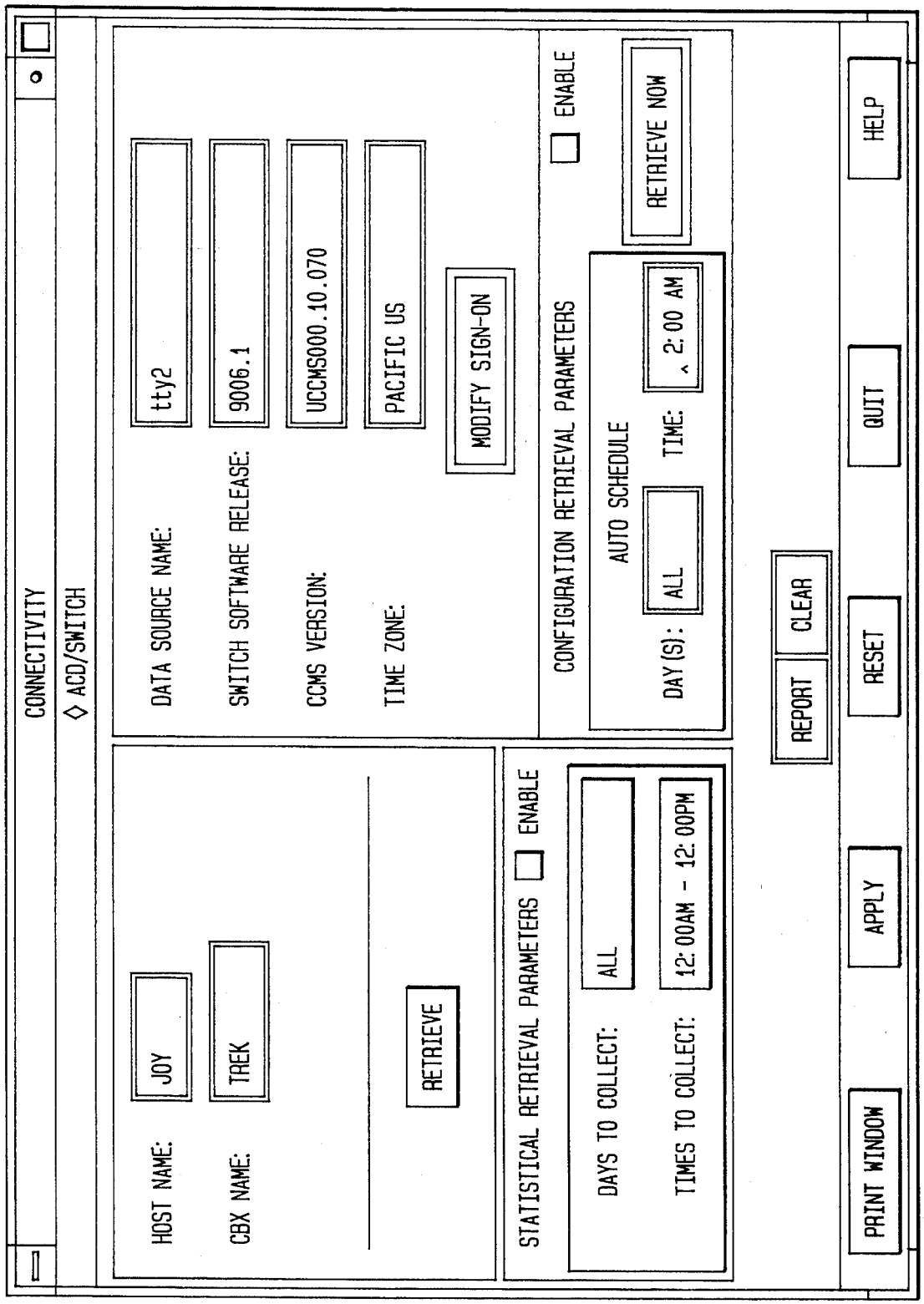
FIG. 6 shows one possible screen layout for allowing a user to enter a collection schedule in accordance with embodiments of the present invention.

The process illustrated in FIG. 5 is repeated for the duration of the data collection schedule specified by the user. A default collection interval such as 15 minutes may be used.

FORMAT OF SELECT COMMANDS AND DATA RECORDS

Each SELECT statement obtains data from a specific database table. A sample format is shown below:

SELECT*from <table_name> where d_time between datetime (YY-MM-DD HH:MM) and datetime (YY-MM-DD HH:MM)

[this selects all records from table name for a particular time interval]

SELECT*from <table_name>

[this selects all records from table_name]

One of ordinary skill in the art will recognize the above as various types of SQL-compatible queries which can be used with most any relational database, such as INFORMIX.

The data which each data server sends to data collector 215 is preferably sent in ASCII. For each row in the database table, a record is sent which is terminated by a linefeed character. Within each of these records is the set of fields from the database table, listed in the same order as they are stored in the table. A vertical bar may be used to delimit fields in the response.

Each data server may transmit database table data by piping the data directly to Zmodem, a well-known and widely available "freeware" package which allows files to be transferred between systems. Since Zmodem sends status messages to the standard error device, both the data server and data collector 215 must redirect the standard error output before invoking Zmodem to prevent messages from appearing on the console.

When Zmodem terminates, data collector 215 may send a command to the data server to obtain the status of the Zmodem transmission. If an error was detected, data collector 215 should log an error message. If data collector 215 has started Zmodem but the data collector encounters a problem in starting Zmodem, the Zmodem on data collector 215 will time out, and data collector 215 must "flush" all characters off of its port to discard error messages sent by the data server. On the other hand, if the data collector starts Zmodem successfully but data collector 215 encounters a problem in starting it, data collector 215 must send a string of control-X's to the data server to terminate Zmodem on the CBX side.

Certain minor changes to the standard Zmodem may be made to enhance its operation with the present invention. In particular, Zmodem normally checks an environment variable to determine the filename to be transmitted. It may be modified on the data server side to instead check for a filename specified on the command line in order to allow data collector 215 to specify the file name. On the collection computer 214 side, Zmodem may be modified slightly to inhibit sending the terminating carriage return and linefeed when sending an acknowledgement, and should be modified to log errors into a message log on collection computer 214. Finally, changing the block size constant (KSIZE) from 1024 to 2048 allows Zmodem on collection computer 214 to acknowledge blocks only after receiving 2048 bytes, requiring fewer acknowledgements. Of course, other communication packages other than Zmodem may be used.

Each data server 210 terminates when data collector 215 logs off using a log-out command.

DATA COLLECTOR STRUCTURE

Figure 7:
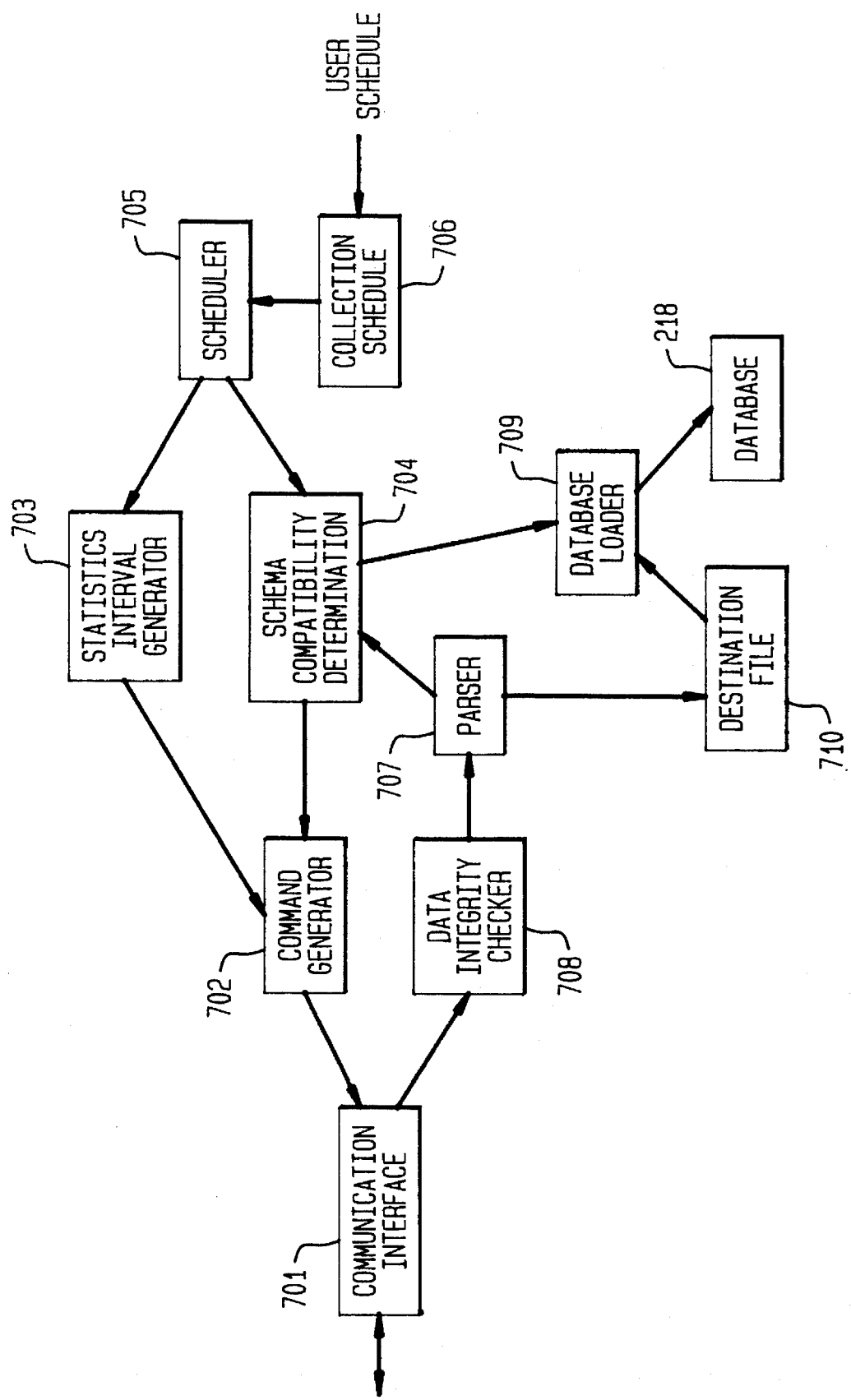
FIG. 7 shows one possible manner of implementing data collector 215 of FIG. 2 in accordance with embodiments of the present invention.

FIG. 7 shows how data collector 215 may be implemented as a group of functions and data structures on computer 214 of FIG. 2 (that is, all of the functions and data structures of FIG. 7 may reside on physical computer 214). Beginning at the right side of FIG. 7, the user-specified data collection schedule (including a list of CBXs and collection times) is stored into a collection schedule data structure 706. Scheduler 705 periodically refers to collection schedule 706 to determine when a data collection session should begin. Initially, scheduler 705 instructs schema compatibility determination function 704 to determine the compatibility between the database stored on each CBX and that of database 218. Schema compatibility determination function 704 in turn issues a request to command generator 702 to generate a schema command in turn to each CBX listed in the collection schedule 706. Command generator 702 generates such a command and transmits it through communication interface 701 (which may comprise the Zmodem protocol) to the designated CBX.

Information received from each CBX returns by way of communication interface 701, and may be passed through data integrity checker 708 and parser 707 to extract the received information (note that data integrity checking for commands may be provided by using the full duplex echo from each data server 210 to check each character as it is sent, while data integrity checking for database records may be provided by Zmodem itself). Communication interface 701 may be constructed so as to include parts of command generator 702, data integrity checker 708, and parser 707. The schema configuration in each CBX is transmitted to schema compatibility determination function 704, which relays this information to database loader 709 in order to accommodate possible differences between database schemas.

Data collection begins when scheduler 705 determines that it is time to collect data from a particular CBX. In this regard, scheduler 705 instructs statistics interval generator 703 to generate one or more time intervals for data collection from the designated CBX (depending on whether data has already been collected from the particular CBX). Command generator 702 generates an appropriate SELECT command and transmits it to the designated CBX through communication interface 701.

Data returned from each CBX passes through data integrity checker 708 and parser 707, which unpacks the data and stores it into destination file 710. When all the data intervals for a particular collection session are stored into destination file 710, database loader 709 reads the data from destination file 710 and stores it into database 218, making any necessary adjustments for schema differences (e.g., padding fields or ignoring fields as needed).

DATA SYNCHRONIZATION

When data is received from each data server, data collector 215 attempts to load records into a corresponding table in database 218. If some records are loaded and an error is encountered, data collector 215 will "roll back" the table to the state it was in before any entries were added. When all records from a particular time interval are added to a table in database 218, data collector 215 "commits" the records.

Data collector 215 may be able to select information from some tables, but not others, in a data collection session. In this case, it must keep track of which tables did not get the information for the current interval. When the time comes for the next data collection session, data collector 215 proceeds to the next interval for the tables for which it obtained the last interval, but stays at the previous interval for the other tables where it encountered a problem. In other words, for each database table, data collector 215 must keep track of which data intervals need to be obtained from the CBX. Doing so allows it to retrieve information for a table which had a problem, but then was repaired on the CBX. For such a table, data collector 215 stays at the interval in which it encountered a problem until one of the following occurs:

a. Data collector 215 is able to obtain data for that interval, or b. Data collector 215 cannot obtain data for that interval, but is able to obtain data for a following interval. In this case, data collector 215 proceeds to the interval after the last one collected in its net data collection session. In addition, data collector 215 may log an error message for each interval for which data could not be collected. The error message may include the database type (statistics or configuration), the data type of the table, the table name, and the interval not collected (for example, 1:00 to 1:15).

In the case where data collector 215 has been off-line for a period of time and then gets reconnected to the CBX, it must be able to collect data starting from the interval where it left off for each table to the last interval stored on the CBX.

CONFIGURATION CHANGES

In various embodiments, each record in each statistics table maintained in each CBX includes a field indicating whether a configuration change has been made on the CBX (for example, adding a new agent or group). When data collector 215 collects statistics information from each CBX, it checks this configuration change flag in each record to determine if the configuration for that CBX has been changed. If so, data collector 215 initiates a transfer of the configuration database stored on the CBX into database 218 in order to ensure that the configuration database stored in database 218 matches that stored in the CBX.

CREATING ORGANIZATIONAL HIERARCHIES

Various embodiments of the present invention contemplate the creation, modification and storage of information relating to management organizations which are superimposed on the agent/group structure maintained within each CBX. Thus, while each CBX maintains information relating specific agents to groups for the purposes of automatically routing incoming telephone calls and maintaining statistics at the agent and group level, it is desirable to superimpose a hierarchy on top of the agent/group structure, wherein the hierarchy can be arbitrarily defined, changed, and used as the basis for accumulating telephone calling statistics in a manner not possible at the CBX level. Thus, the present invention contemplates accumulating telephone statistics not only on a timed basis (as depicted in FIG. 3), but on a hierarchical basis as well, as will now be described.

Figure 8:
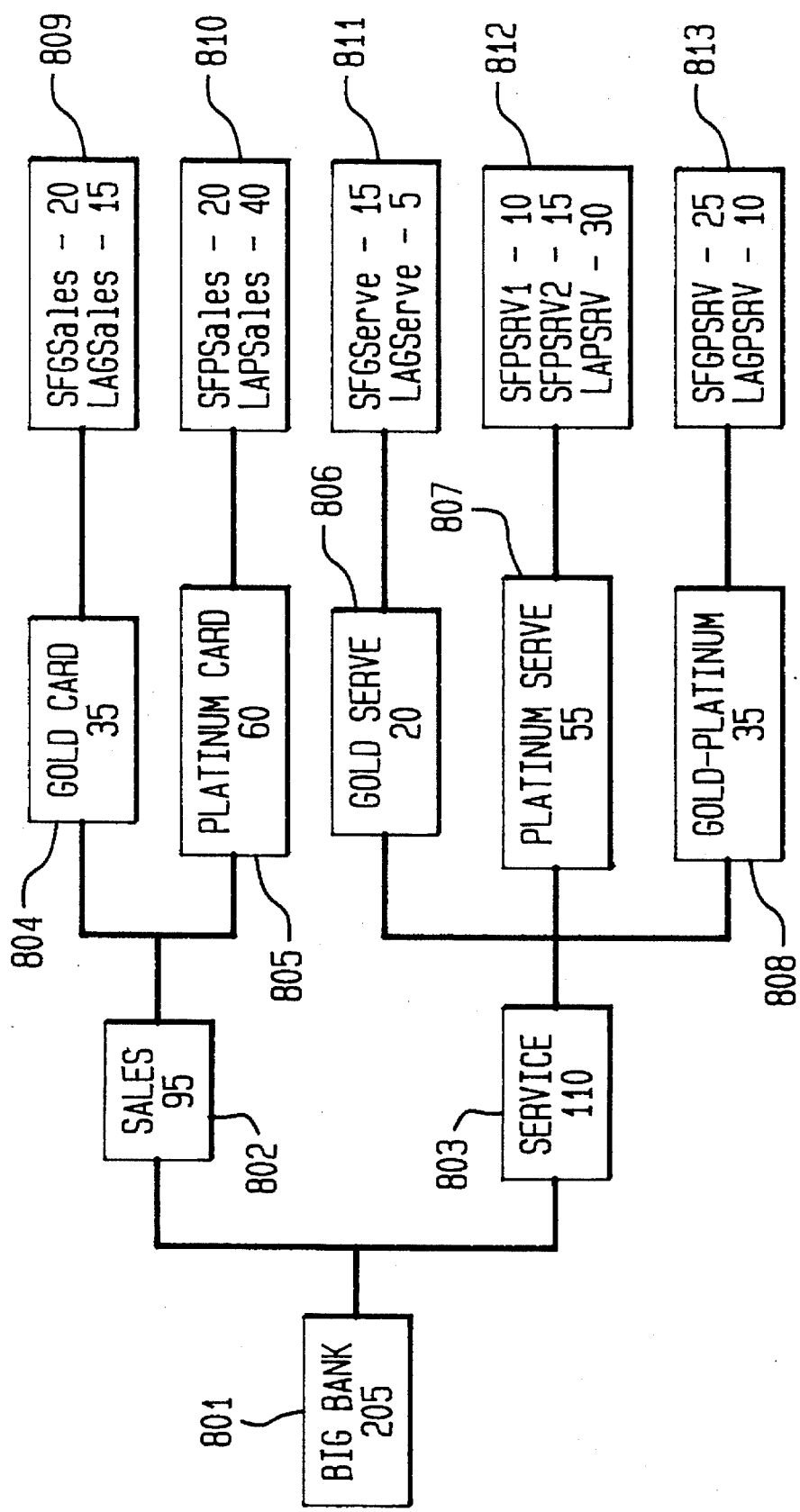
FIG. 8 shows an example of accumulating telephone calling statistics in a hierarchical manner beyond the groupings recognized in each CBX in accordance with embodiments of the present invention.

FIG. 8 shows an example of accumulating telephone calling statistics in a hierarchical manner beyond the groupings recognized in each CBX (the number within each box represents the number of telephone calls received at that level of the hierarchy, as will be explained in greater detail below). In essence, business structure information has been added to the group information recognized by each CBX. In FIG. 8, an organizational structure is shown for the fictitious "Bigbank" company. The "root" of this structure, Bigbank 801, is divided into two major departments: sales 802 and service 803. The sales department is further divided into two sections 804 and 805: one responsible for the sales of gold card credit facilities (the credit and financial services that the bank provides for retail customers who use its gold credit cards), and the other responsible for platinum card credit facilities. Both sections have groups of agents to handle incoming telephone calls.

The service department 803 is divided into three sections 806, 807 and 808, the first responsible for servicing gold card credit accounts, the second for servicing platinum card credit accounts, and the third for servicing both types of accounts. All three sections have groups of agents to handle calls.

Gold card section 804 is serviced by two groups of agents in 809: SFGSales (San Francisco Gold Sales, located in San Francisco) and LAGSales (Los Angeles Gold Sales, located in Los Angeles). Each group would typically be connected to a separate CBX; in the example of FIG. 8, Gold card section 804 thus includes agents at two different physical locations. Other groups are as depicted in FIG. 8, with each group within elements 810–813 being the highest organizational level recognized by a particular CBX.

The organizational structure of FIG. 8 may be created in accordance with the present invention as will be described in more detail herein. Each organizational structure is used to define how statistics are accumulated. For example, after creating the organizational structure of FIG. 8, a report can be generated which shows various telephone calling statistics for any of the following organizations or conglomerations:

total number of calls for a particular group (such as San Francisco Gold Card Sales, contained in element 809))

average time spent talking across all groups which provide gold card service (element 806)

total number of abandoned calls across all groups which provide platinum card service (element 807)

total number of calls across all groups which handle gold card sales (element 804)

average time spent waiting across all service groups (element 803)

average time spent talking for all agents in Bigbank (element 801).

Because statistics are available not only by group, but by individual agents, organizations can be created based on a hierarchy not tied to a particular calling group. Thus, in addition to statistics being kept for San Francisco Gold Sales as a group, statistics are also maintained for each agent in that group, and thus agents can be "grouped" in a manner independent from the CBX groups tied to telephone lines. As one example, all agents who were hired in a particular year could be grouped together and statistics accumulated automatically for that "group" of agents, even though they work at different locations and from different CBXs.

Data totals are contemplated to be stored in the database for individual members of the organization as well as for each level of the organizational chart as the data is collected. In FIG. 8, the number in each box represents the number of telephone calls handled for that organizational entity over a particular period of time (e.g., 15 minutes), with a total of 205 telephone calls handled for Bigbank. Thus, the Bigbank total may be accumulated automatically as the data is collected, rather than waiting until a report is requested. For an accumulation which spans a long time period (such as a year), the "raw" 15-minute data records may have been deleted long ago to conserve disk space, while the intermediate accumulations of week and month may still be retained, allowing a yearly total to be accumulated without the "raw" data.

The present invention contemplates storing accumulated information based on a "view" of the organization. For any one day, there is only one "view" of the organization. Initially, there may be a "current view", and if changes are made to the organizational structure, these changes are stored in a "pending view". The pending view may be modified as desired, and at a specified date, the latest version of the pending view will be converted into the current view. The old current view then becomes a "past view" that is valid for a particular date range, such as from Jan. 3 to Feb. 22. Data accumulation is normally for the current view, but may be for a past view if collecting old data.

Data may be adjusted for the time zone in which a member of the organization is located. For example, data for groups located in the Eastern time zone that report to a management group located in the Pacific time zone may be accumulated with three hours subtracted from the time intervals. In the Bigbank example of FIG. 8, data from groups in the Eastern time zone for the 9:00 a.m. interval may be accumulated into the 6:00 a.m. interval for the management group located in the Pacific time zone.

Figure 9:
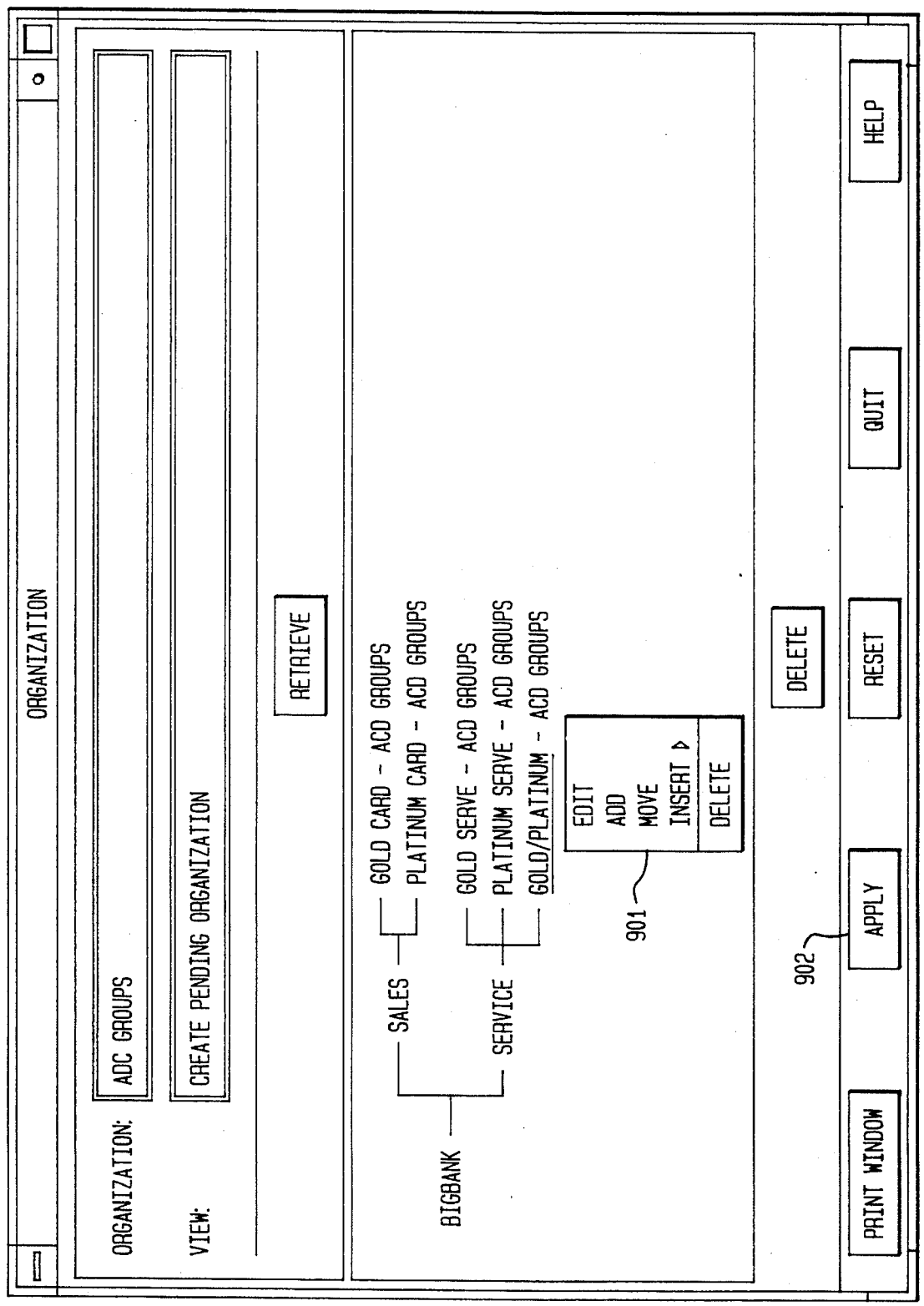
FIG. 9 illustrates one example of a computer screen which may be used to create and modify organizations in accordance with embodiments of the present invention.

The organizational structure shown in FIG. 8 may be created through the use of screens controlled by user interface 216 of FIG. 2 (all of which may operate on computer 214 of FIG. 2) as will now be described. FIG. 9 shows an example of a screen for allowing a user to create or modify a new organization. The "view" depicted in FIG. 9 is a "pending" organization which has not yet been made the "current" view. The user may add to the tree structure by using a mouse and pop-up windows to enter information. Creating an organization preferably proceeds in a "top-down" manner, wherein the Bigbank group is created first, followed by the Sales and Service groups, etc. By highlighting one of the groups (such as Gold-Platinum, highlighted in FIG. 9), a pull-down menu 901 may be provided to allow the user to edit, add, move, or delete the group. When all of the desired modifications have been made to the organization chart, an "Apply" button 902 may be selected to save the "pending" organization. The "pending" organization will be stored into the "current" organization for which statistics will be automatically accumulated, on the date specified.

FIG. 10 shows how individual employee information may be entered from a computer screen. Referring to FIG. 10, entry fields 1001 can be used to enter the employee's name, and if the employee is an agent, an agent log-on identifier 1002 and ACD (automatic call distribution) group 1003 identifier. Because a particular employee (agent) may have more than one log-on identifier, entering all such log-on identifiers and associating them with the specified employee allows the user to refer merely to the employee name when creating reports, rather than specifying all the log-on identifiers (which are stored in each CBX rather than employee names). Additionally, the employee's current supervisor 1004 is entered. After entering a plurality of employees in this manner, an administrative hierarchy can be automatically created. The administrative organization can be separate and apart from the "group" organization shown in FIG. 9. That is, statistics can be accumulated by one or more administrative hierarchies (supervisors, managers, individual employees, etc.), and they can also be separately accumulated by one or more business hierarchies (company-wide, department, division, sales group, etc.). Although administrative and business hierarchies are illustrated as two specific structures, other hierarchies are of course possible and the invention is not intended to be limited in this respect. For example, hierarchies can be created based on log-on identifiers or trunk groups. Using separate hierarchical schemes each having a separate accumulation structure, reports can be generated for specific groupings of agents (for example, the Sales group, regardless of which specific agents are currently assigned), and reports can also be generated for specific persons, regardless of the groups to which they have been assigned.

Figure 11:
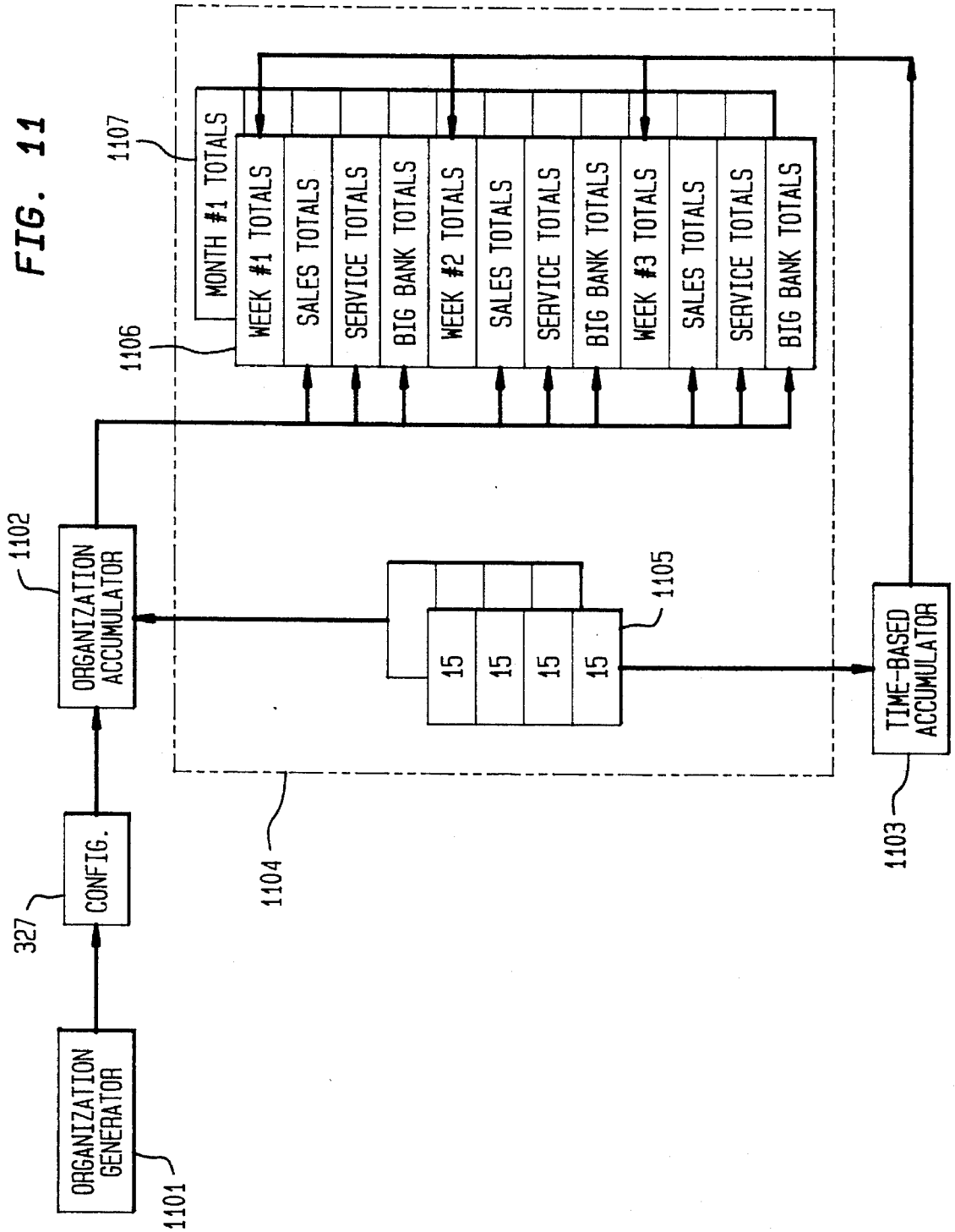
FIG. 11 shows an example of how organizational and timed statistics may be accumulated into data records in database 1104 in accordance with embodiments of the present invention.

FIG. 11 shows how telephone calling statistics may be accumulated into various data records by organizational structure. The components shown in FIG. 11 may all reside on computer 214 of FIG. 2. Organization generator 1101 generates organizational information in accordance with the information entered by the user in the screens shown in FIGS. 9 and 10 and stores the information into configuration database 327, which may be the same configuration database illustrated in FIG. 3. This information identifies the structure by which statistics will be accumulated at various levels. In accordance with the principles explained with reference to FIG. 3, data records at various timed intervals are collected into database 1104 into tables 1105, for example using data records which each represents a 15-minute summary of information generated by each CBX. It will be noted that each data record in tables 1105 may contain a plurality of fields, each field holding a value of a particular statistic (i.e., total number of calls received for a group, or average time spent waiting per agent).

Data records are stored in tables 1105 as a result of the automated data collection process from a plurality of CBXs. As data records are collected, time-based accumulator 1103 accumulates values across a plurality of records in tables 1105 and stores corresponding totals into data records in tables 1106 and 1107. Thus, table 1106 may correspond to table 322 of FIG. 3, each record of which contains statistics accumulated on a weekly basis, while table 1107 may correspond to table 323 of FIG. 3, each record of which contains statistics accumulated on a monthly basis. In accordance with the present invention, time-based accumulator 1103 stores totals on a weekly basis into table 1106 and on a monthly basis into table 1107.

Organization accumulator 1102 refers to configuration database 327 to ascertain which organizational totals are to be accumulated, and accumulates data records from tables 1105 into organizational totals records in tables 1106 and 1107. As shown in FIG. 11, the organizational hierarchy has been created to record totals by sales department, service department, and Bigbank. Thus, each record in table 1106 which relates to the organization contains accumulated totals by week by organizational unit. The information is accumulated automatically during the data collection process, such that table 1106 may be updated on the same interval as data is collected from each CBX. Similarly, table 1107 may be updated on the same interval as data is collected from each CBX but with each record representing monthly statistics. Accordingly, data is accumulated incrementally and in desired units during the data collection process, rather than at the time a report is generated. Accumulators 1102 and 1103 may be combined into one accumulator. As pointed out previously, data records from table 1105 may be periodically deleted (for example, on a "rolling basis" after 42 days) to conserve disk space, while the accumulation tables illustrated by table 1106 may be retained. In this manner, useful information from the "raw" data may be retained without actually retaining the raw data.

In various embodiments, organization accumulator 1102 may store records in tables 1105 by organizational level. That is, 15-minute records may be stored in tables 1105 for sales, service, and bigbank, in addition to being accumulated into tables 1106 and 1107 over longer time intervals.

REPORT GENERATION

Figure 12:
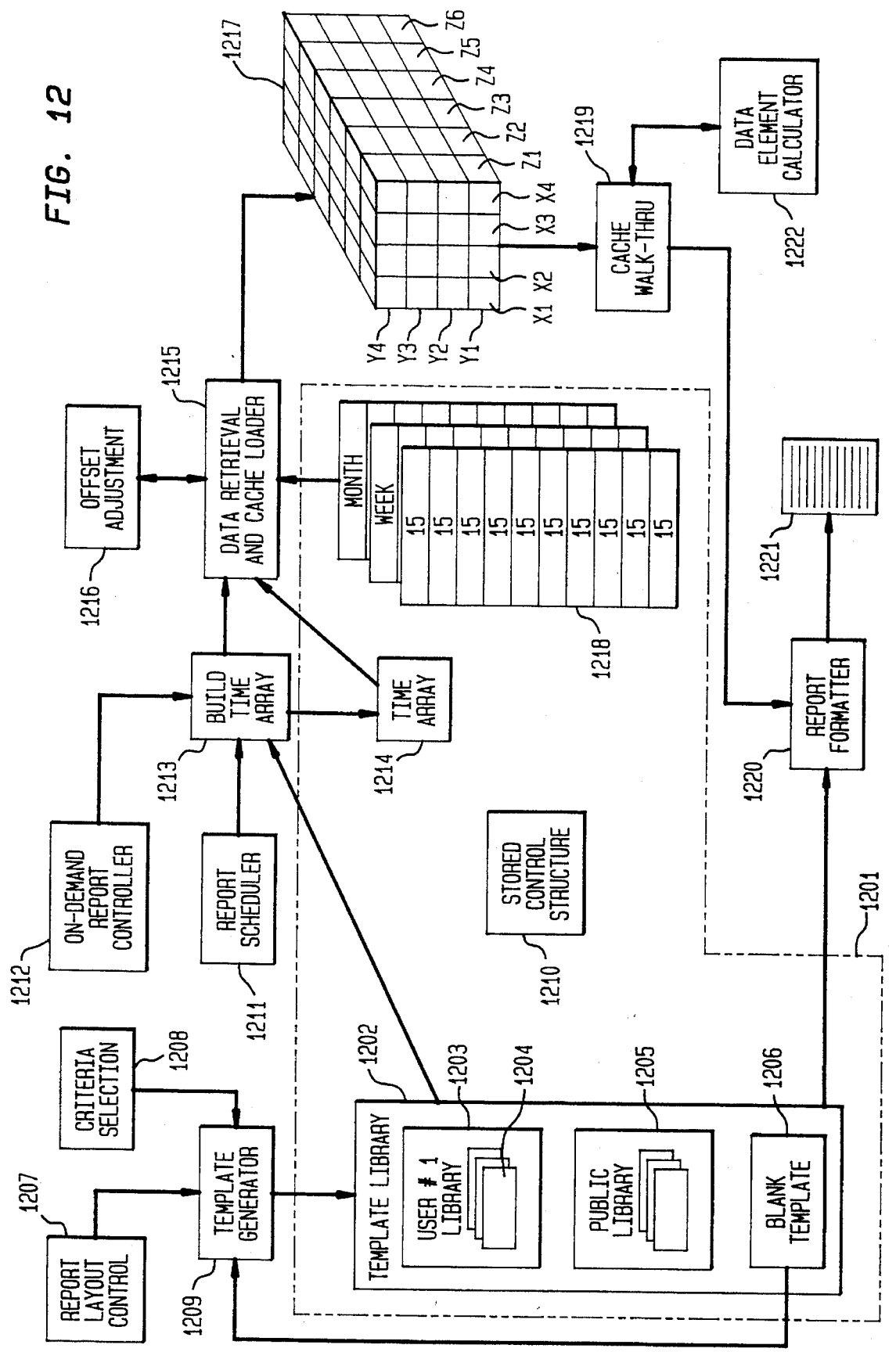
FIG. 12 shows one implementation of various report generation features in accordance with embodiments of the present invention.

In accordance with the principles of the present invention, the information created in table 1106 (and other similar tables shown in the Figures) may be used to create on-demand or automatically scheduled reports. FIG. 12 shows one possible implementation for the report generation features of the present invention; FIGS. 13 through 18 show various possible screen layouts for allowing a user to enter report information and generate reports. The following describes in more detail the operation of the report generation features of FIG. 12 with references to the display screens of FIGS. 13 through 18 as appropriate. All of the components shown in FIG. 12 may reside on computer 214 of FIG. 2.

In FIG. 12, a database 1201 (which may be located within database 218 of FIG. 2) comprises a template library 1202 which contains user libraries 1203, a public library 1205, and a blank report template 1206. Each user library 1203 may comprise one or more report templates 1204 each of which contains information needed for generating a report, including what data will be displayed and how the report is to be formatted. Each user library 1203 may be separately protected from other users, such that only a particular user having specified access privileges may create the reports included in his user library. Thus, for example, reports which contain sensitive information can only be generated using templates which are stored in a user library with protection features. On the other hand, public library 1205 contains report templates which can be accessed by any user, and no protection is needed to prevent unauthorized access.

Report layout control function 1207 and criteria selection function 1208 may be used in various embodiments to design the contents and format of a particular report. Template generator 1209 receives the layout and criteria information from report layout control function 1207 and criteria selection function 1208 and, beginning with a "blank" template 1206, generates a report template for storage into template library 1202. Once a report template is created, a report may be generated either on demand or on an automatically scheduled basis from the template. Generally, report layout control 1207 handles formatting information (e.g., how the report looks and the units in which information is displayed), while criteria selection function 1208 qualifies what data will be displayed in the report (e.g., what fields from the database, what time zones, etc.). Although shown separately for purposes of discussion, these two functions can of course be combined.

In various embodiments, each report comprises a report header and one or more report sections, each section comprising a section header, column headers, and columns and rows of data. FIG. 13 shows an example report comprising a report header 1301, column headers 1302 and 1303, section header 1304, and a plurality of data rows 1305 each row having a plurality of column values arranged under appropriate column headers. In accordance with the invention, a user may specify the layout and data included in each report without the need for using or understanding database query languages such as Structured Query Language (SQL).

Figure 14:
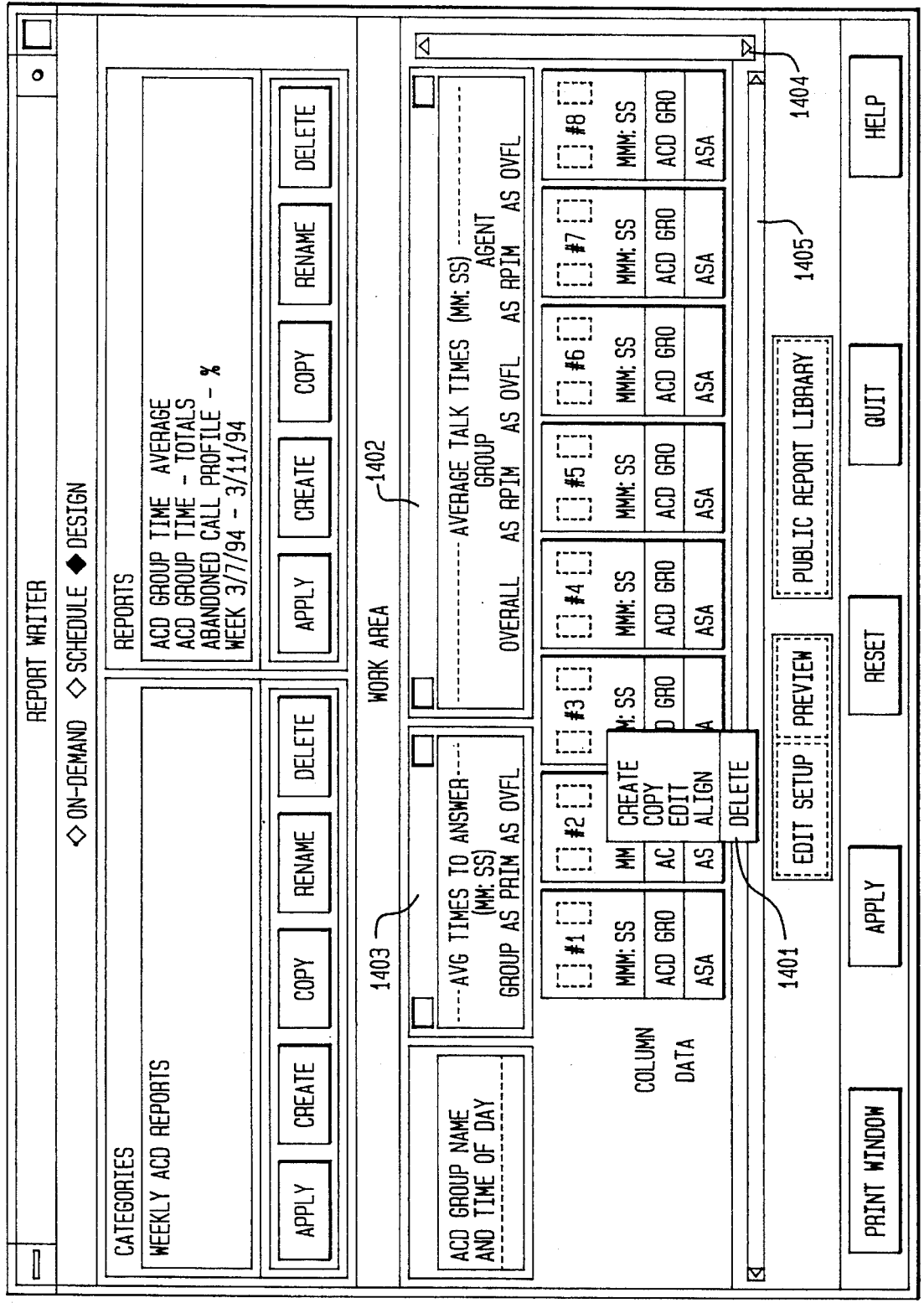
FIG. 14 shows an example of a screen layout for allowing a user to edit the layout of columns for a particular report in accordance with embodiments of the present invention.

FIG. 14 shows one possible implementation of a data entry screen which allows a user to specify the layout and a portion of the data to be included in a report. A pull-down menu 1401 allows the user to create, copy, edit, align or delete columns of data as desired. Additionally, the user may create and manipulate graphically various column headers 1402 and 1403 using a mouse pointer, for example. Scroll bars 1404 and 1405 may be used to arrange the created information within the space available in the display window. In the example of FIG. 14, eight columns are shown as having been created by the user. When a new column is created, report layout control function 1207 automatically displays the new column, and then preferably invokes the setup information display screen shown in FIG. 15 to allow the user to specify certain information about the data which is to appear in that column of the report. Thus, in various embodiments, the display screen of FIG. 15 is invoked after each column in FIG. 14 is created and the user enters information accordingly.

With reference to FIG. 15, the user may specify a data type 1501 for the column, such as agent or group, and a data element name 1502 which identifies either the specific data item to be displayed or a calculation value which corresponds to a mathematical operation performed on one or more specific data items (such as an average of two data items). Display box 1503 may display the text description of a particular data element name highlighted by the user. Thus, while data element names in box 1502 preferably correspond to record field names (or calculations thereon) from accumulation records stored in database 311 of FIG. 3, display box 1503 allows a novice user to select data elements for display based on an easy-to-read description of the data element. Display format box 1504 allows the user to specify the format, units, column width, and other formatting information for each column. Time offset box 1505 allows the user to specify time and organizational offsets. A time offset may be used to time-shift fields which are juxtaposed in a report, such that a first column may represent today's total number of calls per agent, while a second column to its right may represent yesterday's total calls per agent. Thus, offsets provide an easy way to compare the same data element under different conditions. The offsetting is performed by offset adjustment function 1216 shown in the top of FIG. 12 as described later with reference to data retrieval from the database. An organizational offset may be used to compare different levels of information in the organization hierarchy (for example, comparing Bigbank's total phone calls per agent with the Sales department of Bigbank). The information entered by the user in screens 14 and 15 is stored in a template generated by template generator 1209 and stored into a report template in template library 1202.

Figure 16:
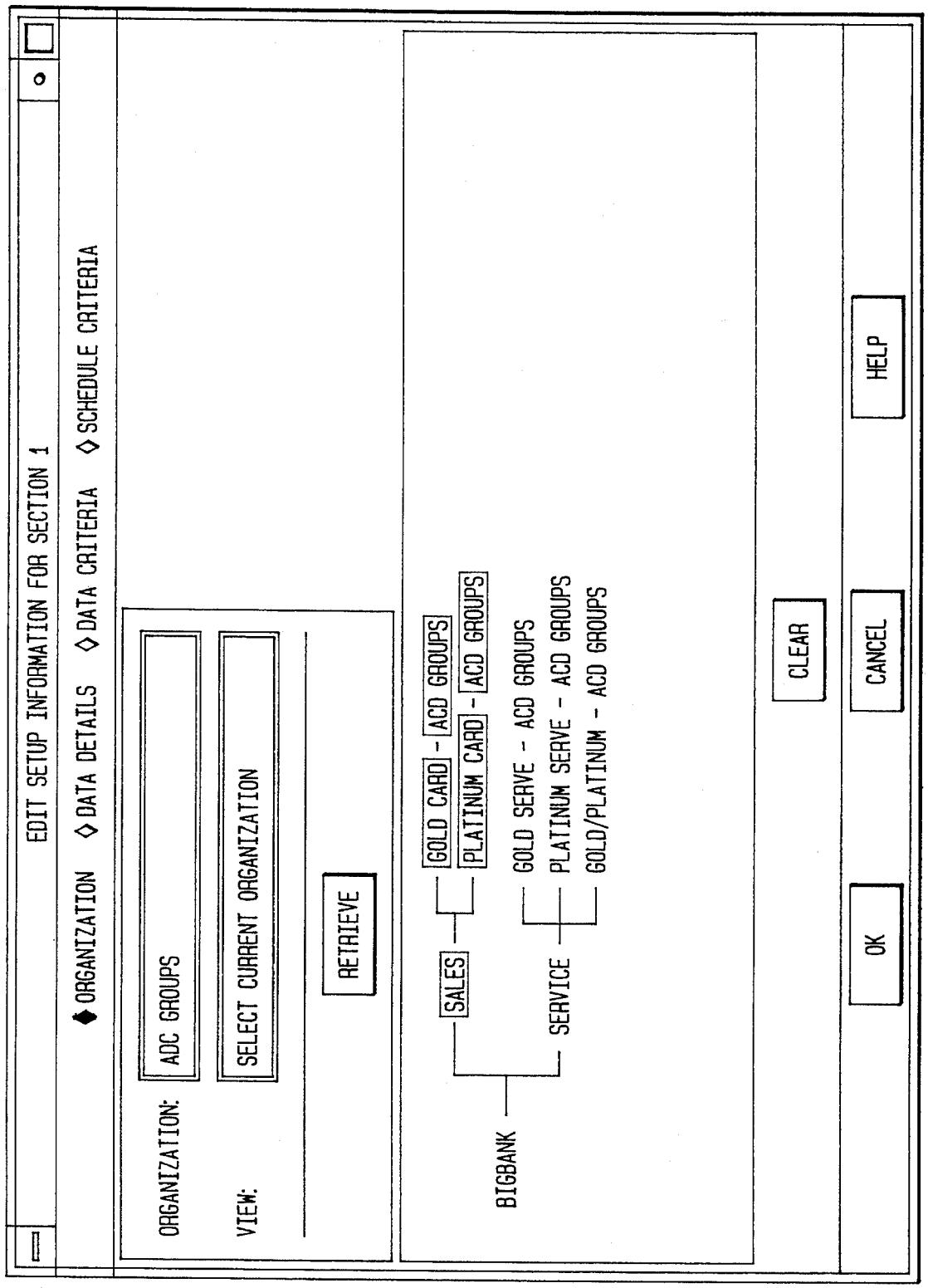
FIG. 16 shows an example of a screen layout for allowing a user to select organization members for display in a report in accordance with embodiments of the present invention.

In accordance with the principles of the present invention, the user may also select the organizational levels which will be displayed in each report. FIG. 16 shows one possible screen which may be used to allow the user to select the organizational levels which will be displayed; these preferably correspond to the organizational levels accumulated in database 1104 of FIG. 11. In other words, the user may graphically select the organizational level using the display screen of FIG. 16 without understanding the particular database record structures used to store the same information. Thus, FIG. 16 shows that data will be reported at the Gold Card level (representing multiple groups of agents); the report shown in FIG. 13 displays **Gold Card as a section header indicating that the data in that report section is accumulated at the Gold Card organization level.

FIG. 17 shows one possible screen display for allowing the user to enter "data details" indicating the time accumulation level that each row in the report will correspond to. For example, FIG. 17 shows that "Quarter Hour" has been selected; the report shown in FIG. 13 accordingly includes rows which represent 15 minute time increments. Because it is contemplated that this data is already stored and available in the appropriate time accumulation level in the tables shown in FIGS. 3 and 11, the time accumulation level inferentially specifies the particular data table from which data will be retrieved.

Figure 18:
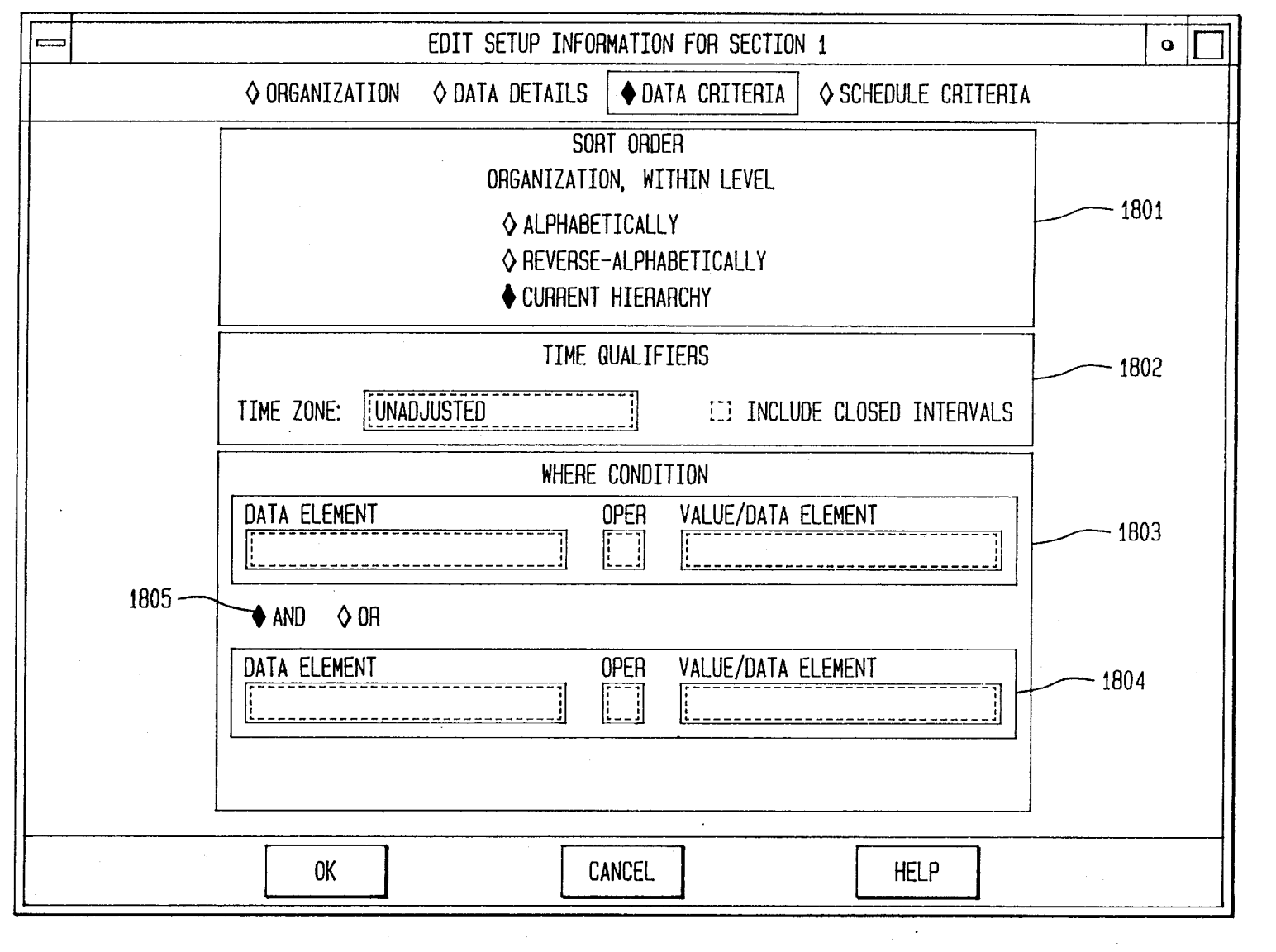

Finally, FIG. 18 shows one possible screen display for allowing the user to enter "data criteria" including organization sort order 1801, time qualifier 1802, and "where conditions" 1803 and 1804. The organization sort order specifies the order in which organizational data will be displayed in the report. Each organization may be displayed, for example, in alphabetical order, reverse alphabetical order, or current hierarchy order, the latter indicating that report sections will be presented in the order in which they appear in the organizational hierarchy. Time qualifier 1802 allows the user to present data as if it occurred in a different time zone. This feature may be particularly important in the case where data is collected from multiple CBXs located in different time zones. The default may be set to "unadjusted" so that times in each report appear as collected in their "native" time zone. If the report generator is located in San Francisco and the "unadjusted" option is used, the report may contain data from the time zones of the different CBXs, although the user may have intended that data be compared at the same "absolute" time. In various embodiments, a pop-up window may be displayed (not shown) to allow the user to select from a plurality of time zone choices. If one of these time zones is selected, then all data will be "translated" into the selected time zone to allow the user to properly compare data. For example, if data is collected from a West coast CBX and an East coast CBX, the user could select a Central time zone qualifier, and all data from each coast would be "translated" forward or backward appropriately to appear in the report.

In FIG. 18, various "where" conditions may be used to further qualify the data presented in the report. For example, the report may be limited to displaying only data in which the average number of telephone calls exceeded 200 per hour. This can be done by entering the appropriate data element name, operator and value in window 1803. Moreover, multiple conditions may be logically joined with an "AND" or "OR" operator 1805 for more complex operations.

After the above described information is entered by the user, template generator 1209 may create a report template, assign it a name designated by the user, and store it in one of the user libraries 1203 or public library 1205. Additionally, in various embodiments it may be desirable to pre-create internal data structures based on the template information and store such structures into stored control structure 1210 in order to speed up retrieval at report generation time.

On-demand report controller 1212 allows the user to select a date and time range for data to be included in the report; this may be selected using a display box 1306 such as that shown in FIG. 13. Alternatively, report scheduler 1211 may be used to "permanently" schedule reports on a daily basis, hourly basis, or the like, with data retrieval tailored to the schedule. Either on-demand report controller 1212 or report scheduler 1211 can be used to invoke build time array function 1213, which in various embodiments may create a time array 1214. Such a time array may be used to hold information such as the dates and times requested, the types of totals requested (daily, weekly, hourly, etc.), time zone information, and the like.

Data retrieval and cache loader 1215 generates one or more SQL statements to retrieve data from accumulation tables 1218 based on information from the report template. In summary, a SQL statement is generated which selects one or more tables based on the accumulation levels selected (e.g., shift, week, month, Gold Card Section, Bigbank, etc.); selects one or more fields in these tables based on the data elements selected (e.g., total number of calls generated per agent); and further qualifies records based on the time range specified for the report (box 1306 in FIG. 13) and any criteria specified in FIG. 18 (such as "where total number of calls is greater than 200"). It should be readily understood how the information generated from the aforementioned figures and stored into report templates can be used to form one or more SQL statements for database retrieval.

The SQL statements may be adjusted in offset adjustment function 1216 based on time offsets, organizational offsets, or time zones included in a report template. For example, if a time offset of one day is specified for a second column relative to a first in a report, then the SQL statement will be adjusted to retrieve data for the same time (but preceding date) from that specified in the first column. Similarly, if the user specified a "Sales" group level for display in the report, an organizational offset of +1 would also retrieve data at one level higher than the Sales group for juxtaposition in the report.

Time zone translation may be performed as follows. When an organization is selected which includes accumulated data from CBXs in different time zones, data retrieval and cache loader 1215 creates two separate SQL statements, one for each CBX table (see FIG. 3), and changes the time qualifier in one or more of the SQL statements to account for the different time zone.

Data retrieval and cache loader 1215 retrieves data from one or more tables, including accumulation tables 1218, and loads cache 1217 with the retrieved data. Although there any many different ways of loading the retrieved data into a memory structure, in various embodiments cache 1217 may be loaded with the retrieved data as follows, by way of example. A three dimensional structure may be created having an X axis with elements X1 through X4, a Y axis with elements Y1 through Y4, and a Z axis with elements Z1 through Z6. The X axis may be used as a time axis (each element representing a unit of time such as one week), the Y axis may be used to indicate organization members (such as a particular agent, group of agents, or the Sales group), and the Z axis may be used to represent field values in each record (such as total number of calls for a particular agent).

Cache walk-through function 1219 may, in various embodiments, "walk through" cache 1217 one data item at a time and pull the data items into a row of a report. While some data items may be directly pulled into a report row for formatting by report formatter 1220, some "derived" data items may require on-the-fly calculations which can be performed by data element calculator 1222. For example, the user may have specified that a particular column should include the average talk time for a particular agent. Such a value is not directly stored in any field of any database table, but can be derived by dividing the total talk time for that agent over any particular period by the number of calls received by the agent. Thus, for example, if the total number of calls for a particular agent for a particular time period is stored in element (X4, Y1, Z1) and the total talk time for that same agent for the same period is stored in element (X4, Y1, Z2), then an indicator for a division operation can be stored into element (X4, Y1, Z3), and cache walk-through function 1219 can retrieve the two values and pass the division operation to data element calculator 1222 to perform the operation. When all of the operations and data values have been retrieved for a particular row of the report (i.e., holding X and Y constant, and "walking through" all the Z values), a plurality of row values may be provided to report formatter 1220 which, in accordance with the various display formatting information stored in the report template, generates an individual row of report 1221.

Thus has been described above a new and useful invention for collecting data from one or more CBXs, accumulating the information into various time intervals and organizational hierarchies, and generating reports therefrom. It should be understood that specific references to hardware or computer program components herein are by way of example only, the specific allocation of functions between hardware and software components being dictated by the particular requirements and engineering tradeoffs involved in a particular implementation. It will also be recognized that the particular ordering of various steps used to practice any methods of the present invention may be rearranged to achieve the same or substantially the same result, and that any numbering of steps in the appended claims is for ease of reference only and is not intended to limit the scope of the claimed steps to any particular order unless otherwise necessary to make the method of the invention operable.

It is apparent that many modifications and variations of the present invention are possible in light of the above teachings, and references to specific values, part numbers, or standards are by way of example only. It is, therefore, to be understood that within the scope of the appended claims the invention may be practiced otherwise than as specifically described.

What is claimed is:

1. A method of collecting information from a computerized branch exchange (CBX) for receipt by a collection computer coupled to the CBX, the CBX having a statistics database comprising a plurality of statistics records each containing telephone call measurements relating to telephone lines serviced by said CBX, the method comprising the steps of:

(1) specifying a data collection schedule for collecting one or more of said plurality of statistics records from said statistics database;

(2) generating, from said collection computer, a database selection command for selecting a subset of said plurality of statistics records and transmitting, in accordance with said data collection schedule, said database selection command from said collection computer to said CBX;

(3) receiving at said collection computer one or more of said plurality of statistics records from said CBX in response to said database selection command transmitted from said collection computer;

(4) storing said one or more received statistics records into a collection database on said collection computer;

(5) providing an organizational hierarchy which defines a plurality of accumulation levels over which statistics records from said collection database will be accumulated;

(6) accumulating, in accordance with a first one of said accumulation levels in said organizational hierarchy data values from a plurality of said statistics records from said collection database into a first accumulated record and storing said first accumulated record on said collection computer; and (7) accumulating, in accordance with a second one of said accumulation levels in said organizational hierarchy, data values from said plurality of said statistics records from said collection database into a second accumulated record and storing said second accumulated record on said collection computer.

2. The method of claim 1, further comprising the step of repeating steps (1) through (4) for each of a plurality of CBXs coupled to said collection computer, each CBX having a separate statistics database.

3. The method of claim 1, further comprising the steps of:

prior to step (2), generating and transmitting a schema inquiry command from said collection computer to said CBX;

receiving, from said CBX in response to said schema inquiry command, schema information identifying database record formats in said statistics database; determining on the basis of said received schema information whether said database record formats in said statistics database match record formats in said collection database of said collection computer; and responsive to a determination that said record formats do not match, generating a warning message.

4. The method of claim 1, wherein step (2) comprises the step of generating a database selection command comprising a time interval which qualifies said subset of statistics records to be selected from said statistics database.

5. The method of claim 1, further comprising the steps of:
   (8) reading a plurality of statistics records from said collection database;
   (9) accumulating data values across said plurality of statistics records read from said collection database and generating therefrom an accumulation record comprising said accumulated data values; and
   (10) storing said accumulation record on said collection computer.

6. The method of claim 5, wherein step (9) comprises the step of generating an accumulation record comprising information accumulated over a shift.

7. The method of claim 5, wherein step (9) comprises the step of generating an accumulation record comprising information accumulated over a day.

8. The method of claim 5, wherein step (9) comprises the step of generating an accumulation record comprising information accumulated over a week.

9. The method of claim 8, further comprising the steps of:
   (11) repeating step (9) a plurality of times and generating therefrom a plurality of accumulation records each comprising information accumulated over a different week; and
   (12) storing each of said plurality of accumulation records on said collection computer.

10. The method of claim 5, further comprising the steps of:
    (11) reading said accumulation record; and
    (12) generating on said collection computer a formatted report comprising information extracted from said accumulation record.

11. The method of claim 1, further comprising the steps of:
    (8) accumulating data values across a plurality of records read from said collection database into a first accumulated record according to a first fixed time interval and storing said first accumulated record on said collection computer; and
    (9) accumulating data values across said plurality of records read from said collection database into a second accumulated record according to a second fixed time interval and storing said second accumulated record on said collection computer; and
    (10) repeating steps (5) and (6) a plurality of times to generate therefrom a plurality of first and second accumulated records.

12. The method of claim 1, further comprising the steps of:
    using a modem to receive said one or more statistics records from said CBX; and logging off from said CBX after step (3) is completed.

13. The method of claim 1, wherein step (2) comprises the step of verifying the transmission of said database selection command by checking a full duplex echo from said CBX and, responsive to a determination that said transmission is not properly verified, retransmitting said database selection command to said CBX.

14. The method of claim 1, further comprising the step of:
    (8) accumulating data values across a plurality of records from said collection database into a time accumulated record according to a fixed time interval and storing said time accumulated record on said collection computer.

15. The method of claim 1, further comprising the step of repeating steps (6) and (7) a plurality of times and generating therefrom a first plurality of accumulated records and a second plurality of accumulated records, each accumulated record corresponding to one of said accumulation levels.

16. The method of claim 15, further comprising the steps of:
    specifying criteria for selecting a subset of said first plurality of accumulated records;
    retrieving said subset of said first plurality of accumulated records in accordance with said specified criteria; and
    generating a formatted report comprising information extracted from said subset of said plurality of accumulated records.

17. The method of claim 16, further comprising the step of automatically scheduling said formatted report generating step in accordance with a user-specified report schedule.

18. The method of claim 16, further comprising the step of reading a report template and formatting said report in accordance with said report template.

19. A system for collecting telephone call information from a first computerized branch exchange (CBX) having a first statistics database comprising a first plurality of statistics records each containing telephone call measurements relating to telephone lines serviced by said first CBX, the system comprising:
    a scheduler for scheduling a first data collection session with said first CBX in accordance with a first collection schedule;
    a command generator, coupled to and responsive to said scheduler, for generating a first database selection command which specifies a first subset of said first plurality of statistics records to be retrieved from said first statistics database;
    a communication interface, coupled to said command generator, for transmitting said first database selection command to said first CBX and for receiving statistics records from said first CBX;
    a database loader for loading statistics records received by said communication interface into a collection database;
    means for providing an organizational hierarchy which defines a plurality of accumulation levels over which statistics records from said collection database will be accumulated; and
    an organizational accumulator for accumulating, in accordance with a first one of said accumulation levels in said organizational hierarchy, data values from a plurality of statistics records from said collection database into a first accumulated record and storing said first accumulated record into said collection database, and for accumulating, in accordance with a second one of said accumulation levels in said organizational hierarchy, data values from said plurality of statistics records from said collection database into a second accumulated record and storing said second accumulated record into said collection database.

20. The system of claim 19, wherein said scheduler further schedules, in accordance with a second collection schedule, a second data collection session with a second CBX having a second statistics database comprising a second plurality of statistics records;

wherein said command generator further generates a second database selection command which specifies a second subset of said second plurality of statistics records to be retrieved from said second statistics database;

wherein said communication interface further transmits said second database selection command to said second CBX and receives statistics records from said second CBX; and wherein said database loader further loads statistics records received by said communication interface from said second CBX into said collection database.

21. The system of claim 19, further comprising:

a schema compatibility determination function for generating and transmitting a schema inquiry command to said first CBX and for determining, on the basis of schema information returned by said first CBX, whether said database record formats in said first statistics database match database record formats in said collection database; and a warning generator, responsive to said schema compatibility determination function, for generating a warning message when said database record formats do not match.

22. The system of claim 19, wherein said first database selection command comprises a time interval which qualifies said subset of statistics records to be selected from said first statistics database.

23. The system of claim 19, further comprising a time-based accumulator for reading a plurality of statistics records from said collection database, accumulating data values across said plurality of statistics records read from said collection database, generating therefrom an accumulation record comprising said accumulated data values, and storing said accumulation record into said collection database.

24. The system of claim 23, wherein said time-based accumulator generates an accumulation record comprising data values accumulated over a shift.

25. The system of claim 23, wherein said time-based accumulator generates an accumulation record comprising data values accumulated over a day.

26. The system of claim 23, wherein said time-based accumulator generates an accumulation record comprising data values accumulated over a week.

27. The system of claim 26, wherein said time-based accumulator generates and stores into said collection database a plurality of accumulation records each comprising information accumulated over a different week.

28. The system of claim 23, further comprising a report generator for generating a formatted report comprising information extracted from said accumulation record.

29. The system of claim 19, further comprising a time-based accumulator for accumulating data values across a plurality of statistics records from said collection database into a first accumulated record according to a first fixed time interval and storing said first accumulated record into said collection database, and for accumulating data values across said plurality of statistics records from said collection database into a second accumulated record according to a second fixed time interval and storing said second accumulated record into said collection database.

30. The system of claim 19, wherein said communication interface comprises a modem, and wherein said system logs off from said first CBX after receiving said statistics records from said first CBX.

31. The system of claim 19, further comprising a data integrity checker, coupled to said communication interface, for verifying the transmission of said database selection command by checking a full duplex echo from said first CBX and, responsive to a determination that said transmission is not properly verified, causing said database selection command to be retransmitted to said first CBX.

32. The system of claim 19, further comprising:

a time-based accumulator for accumulating data values across a plurality of statistics records from said collection database into a time accumulated record according to a fixed time interval and storing said time accumulated record into said collection database.

33. The system of claim 19, wherein said organizational accumulator accumulates and stores a plurality of said first accumulated records and a plurality of said second accumulated records in accordance with said first and second accumulation levels respectively.

34. The system of claim 33, further comprising:

a criteria selector for selecting a subset of said first plurality of accumulated records;

a data retriever for retrieving said subset of said first plurality of accumulated records from said collection database; and a report formatter for generating a formatted report comprising information extracted from said subset of said first plurality of accumulated records.

35. The system of claim 34, further comprising a report scheduler for automatically scheduling said report formatter in accordance with a user-specified report schedule.

36. The system of claim 34, wherein said report formatter reads a user-generated report template and formats said formatted report in accordance with said user-generated report template.

37. The system of claim 19, further comprising means for transmitting to said first CBX a destination file command, wherein said received statistics records are stored into a file name specified in said destination file command.

38. A system for collecting information from a computerized branch exchange (CBX) for receipt by a collection computer coupled to the CBX, the CBX having a statistics database comprising a plurality of statistics records each containing telephone call measurements relating to telephone lines serviced by said CBX, the system comprising:

scheduling means for scheduling, from said collection computer, a first data collection session with said first CBX in accordance with a collection schedule;

command generation means, coupled to and responsive to said scheduling means, for generating a first database selection command which specifies a first subset of said first plurality of statistics records to be retrieved from said first statistics database;

transmitting means, coupled to said command generation means, for transmitting said first database selection command from said collection computer to said first CBX;

receiving means for receiving statistics records from said first CBX;

database loading means for loading statistics records received by said receiving means into a collection database on said collection computer;

means for reading a plurality of statistics records from said collection database;

accumulation means for accumulating data values across said plurality of statistics records read from said collection database and generating therefrom an accumulation record comprising said accumulated data values; and means for storing said accumulation record into said collection database;

wherein said accumulation means accumulates said data values across said plurality of statistics records in accordance with an organizational hierarchy having a plurality of accumulation levels over which statistics records from said collection database may be accumulated.

39. The system of claim 38, wherein said scheduling means further schedules, in accordance with a second user-modifiable collection schedule, a second data collection session with a second CBX having a second statistics database comprising a second plurality of statistics records;

wherein said command generation means comprises means for generating a second database selection command which specifies a second subset of said second plurality of statistics records to be retrieved from said second statistics database;

wherein said transmitting means comprises means for transmitting said second database selection command to said second CBX;

wherein said receiving means comprises means for receiving statistics records from said second CBX; and wherein said database loading means comprises means for loading statistics records received by said receiving means into said collection database on said collection computer.

40. The system of claim 38, further comprising means for generating said organizational hierarchy according to user-selectable criteria.

41. A method of collecting information from a computerized branch exchange (CBX) for receipt by a collection computer coupled to the CBX, the CBX having a statistics database comprising a plurality of statistics records each containing telephone call measurements relating to telephone lines serviced by said CBX, the method comprising the steps of:

(1) generating and transmitting a schema inquiry command from said collection computer to said CBX;

(2) receiving, from said CBX in response to said schema inquiry command, schema information identifying database record formats in said statistics database;

(3) determining on the basis of said received schema information whether said database record formats in said statistics database match record formats in said collection database of said collection computer;

(4) responsive to a determination that said record formats do not match, generating a warning message;

(5) specifying a data collection schedule for collecting one or more of said plurality of statistics records from said statistics database;

(6) generating, from said collection computer, a database selection command for selecting a subset of said plurality of statistics records and transmitting, in accordance with said data collection schedule, said database selection command from said collection computer to said CBX;

(7) receiving at said collection computer one or more of said plurality of statistics records from said CBX in response to said database selection command transmitted from said collection computer; and (8) storing said one or more received statistics records into a collection database on said collection computer.

42. A method of collecting information from a computerized branch exchange (CBX) for receipt by a collection computer coupled to the CBX, the CBX having a statistics database comprising a plurality of statistics records each containing telephone call measurements relating to telephone lines serviced by said CBX, the method comprising the steps of:

(1) specifying a data collection schedule for collecting one or more of said plurality of statistics records from said statistics database;

(2) generating, from said collection computer, a database selection command for selecting a subset of said plurality of statistics records and transmitting, in accordance with said data collection schedule, said database selection command from said collection computer to said CBX;

(3) receiving at said collection computer one or more of said plurality of statistics records from said CBX in response to said database selection command transmitted from said collection computer;

(4) storing said one or more received statistics records into a collection database on said collection computer;

(5) accumulating data values across a plurality of records read from said collection database into a first accumulated record according to a first fixed time interval and storing said first accumulated record on said collection computer;

(6) accumulating data values across said plurality of records read from said collection database into a second accumulated record according to a second fixed time interval and storing said second accumulated record on said collection computer; and (7) repeating steps (5) and (6) a plurality of times to generate therefrom a plurality of first and second accumulated records.

43. A method of collecting information from a computerized branch exchange (CBX) for receipt by a collection computer coupled to the CBX, the CBX having a statistics database comprising a plurality of statistics records each containing telephone call measurements relating to telephone lines serviced by said CBX, the method comprising the steps of:

(1) specifying a data collection schedule for collecting one or more of said plurality of statistics records from said statistics database;

(2) generating, from said collection computer, a database selection command for selecting a subset of said plurality of statistics records and transmitting, in accordance with said data collection schedule, said database selection command from said collection computer to said CBX;

(3) receiving at said collection computer one or more of said plurality of statistics records from said CBX in response to said database selection command transmitted from said collection computer;

(4) storing said one or more received statistics records into a collection database on said collection computer;

(5) accumulating data values across a plurality of records from said collection database into a first accumulated record according to a fixed time interval and storing said first accumulated record on said collection computer; and (6) accumulating data values across said plurality of records from said collection database into a second accumulated record according to an organizational hierarchy and storing said second accumulated record on said collection computer.

44. A system for collecting telephone call information from a first computerized branch exchange (CBX) having a first statistics database comprising a first plurality of statistics records each containing telephone call measurements relating to telephone lines serviced by said first CBX, the system comprising:

a scheduler for scheduling a first data collection session with said first CBX in accordance with a first user-modifiable collection schedule;

a command generator, coupled to and responsive to said scheduler, for generating a first database selection command which specifies a first subset of said first plurality of statistics records to be retrieved from said first statistics database;

a communication interface, coupled to said command generator, for transmitting said first database selection command to said first CBX and for receiving statistics records from said first CBX;

a database loader for loading statistics records received by said communication interface into a collection database;

a schema compatibility determination function for generating and transmitting a schema inquiry command to said first CBX and for determining, on the basis of schema information returned by said first CBX, whether said database record formats in said first statistics database match database record formats in said collection database; and a warning generator, responsive to said schema compatibility determination function, for generating a warning message when said database record formats do not match.

45. A system for collecting telephone call information from a first computerized branch exchange (CBX) having a first statistics database comprising a first plurality of statistics records each containing telephone call measurements relating to telephone lines serviced by said first CBX, the system comprising:

a scheduler for scheduling a first data collection session with said first CBX in accordance with a first user-modifiable collection schedule;

a command generator, coupled to and responsive to said scheduler, for generating a first database selection command which specifies a first subset of said first plurality of statistics records to be retrieved from said first statistics database;

a communication interface, coupled to said command generator, for transmitting said first database selection command to said first CBX and for receiving statistics records from said first CBX;

a database loader for loading statistics records received by said communication interface into a collection database; and a time-based accumulator for accumulating data values across a plurality of statistics records from said collection database into a first accumulated record according to a first fixed time interval and storing said first accumulated record into said collection database, and for accumulating data values across said plurality of statistics records from said collection database into a second accumulated record according to a second fixed time interval and storing said second accumulated record into said collection database.

46. A system for collecting telephone call information from a first computerized branch exchange (CBX) having a first statistics database comprising a first plurality of statistics records each containing telephone call measurements relating to telephone lines serviced by said first CBX, the system comprising:

a scheduler for scheduling a first data collection session with said first CBX in accordance with a first user-modifiable collection schedule;

a command generator, coupled to and responsive to said scheduler, for generating a first database selection command which specifies a first subset of said first plurality of statistics records to be retrieved from said first statistics database;

a communication interface, coupled to said command generator, for transmitting said first database selection command to said first CBX and for receiving statistics records from said first CBX;

a database loader for loading statistics records received by said communication interface into a collection database;

a time-based accumulator for accumulating data values across a plurality of statistics records from said collection database into a first accumulated record according to a fixed time interval and storing said first accumulated record into said collection database; and an organizational accumulator for accumulating data values across said plurality of statistics records from said collection database into a second accumulated record according to an organizational hierarchy and storing said second accumulated record into said collection database.

* * * * *